United States Patent [19]

Cohn

[11] Patent Number: 5,712,995
[45] Date of Patent: Jan. 27, 1998

[54] NON-OVERLAPPING TILING APPARATUS AND METHOD FOR MULTIPLE WINDOW DISPLAYS

[75] Inventor: Robert M. Cohn, Cambridge, Mass.

[73] Assignee: Galileo Frames, Inc., Cambridge, Mass.

[21] Appl. No.: 530,644

[22] Filed: Sep. 20, 1995

[51] Int. Cl.⁶ ............................................. G06F 3/00
[52] U.S. Cl. ............................................. 395/342
[58] Field of Search ............................ 395/155–161, 395/326–358; 345/119–120; 348/564–568

[56] References Cited

U.S. PATENT DOCUMENTS

| | | | |
|---|---|---|---|
| 4,961,070 | 10/1990 | Maher et al. | 345/119 |
| 5,060,170 | 10/1991 | Bourgeois et al. | 395/157 |
| 5,146,335 | 9/1992 | Kim et al. | 348/564 |
| 5,371,847 | 12/1994 | Hargrove | 395/157 |
| 5,390,295 | 2/1995 | Bates | 395/157 |
| 5,487,143 | 1/1996 | Southgate | 395/157 |
| 5,561,757 | 10/1996 | Southgate | 395/157 |

OTHER PUBLICATIONS

Cohen et al., "Automatic Strategies in the Siemens RTL Tiled Window Manager", IEEE, pp. 111–119, 1988.

Myers, "A Taxonomy of Window Manager User Interfaces", IEEE, pp. 65–84, Sep. 1988.

Cohen et al., "Constraint-Based Tiled Windows", IEEE, pp. 2–11, Nov. 1984.

Primary Examiner—John E. Breene
Attorney, Agent, or Firm—Wolf, Greenfield & Sacks, P.C.

[57] ABSTRACT

A user interface provides a non-overlapped tiling mechanism for management of windows or panes. The non-overlapped tiling mechanism provides independent manipulation of panes and partitions between panes, and creates arrays of partitions from an array of panes in a tiled area. The partition arrays include whole partitions, segments, and combinations of segments. The various types of partitions can be managed and manipulated to effect resizing, repositioning and adjustment of multiple panes simultaneously. The mechanism provides free form and arbitrary arrangement of panes in configurations which do not require or necessarily exhibit any particular symmetry, any parent-child relationship, or any other fixed relationship among panes. The mechanism also provides for ad hoc addition, deletion and hiding of panes. Additionally, application regions can be freely associated and displayed with any of the panes, and associations between application regions and panes can be changed.

75 Claims, 18 Drawing Sheets

| 540 Near Edges | 541 Far Edges | 542 Matched Edges | 543 Partitions |
|---|---|---|---|
| 1L (BORDER) | 2R (INTERIOR) | | |
| 2L (BORDER) | 1R (BORDER) | | |
| 3L (INTERIOR) | 3R (BORDER) | | |

Fig. 14A

| 540 Near Edges | 541 Far Edges | 542 Matched Edges | 543 Partitions |
|---|---|---|---|
| 3L (INTERIOR) | 2R (INTERIOR) | 1L (BORDER) | |
| | | 2L (BORDER) | |
| | | 1R (BORDER) | |
| | | 3R (BORDER) | |

Fig. 14B

| 540 Near Edges | 541 Far Edges | 542 Matched Edges | 543 Partitions |
|---|---|---|---|
| | | 1L (BORDER) | |
| | | 2L (BORDER) | |
| | | 3L+2R (INTERIOR) | |
| | | 1R (BORDER) | |
| | | 3R (BORDER) | |

Fig. 14C

| 540 Near Edges | 541 Far Edges | 542 Matched Edges | 543 Partitions |
|---|---|---|---|
| | | 1L (BORDER) | 1L (SEGMENT) |
| | | 2L (BORDER) | 2L (SEGMENT) |
| | | 3L+2R (INTERIOR) | 1L+2L (COMPOSITE WHOLE) |
| | | 1R (BORDER) | 3L+2R (UNITARY WHOLE) |
| | | 3R (BORDER) | 1R (SEGMENT) |
| | | | 3R (SEGMENT) |
| | | | 1R+3R (COMPOSITE WHOLE) |

Fig. 14D

| 540 Near Edges | 541 Far Edges | 542 Matched Edges | 543 Partitions |
|---|---|---|---|
| 1T (BORDER) | 1B (INTERIOR) | | |
| 2T (INTERIOR) | 2B (BORDER) | | |
| 3T (INTERIOR) | 3B (BORDER) | | |

Fig. 15A

| 540 Near Edges | 541 Far Edges | 542 Matched Edges | 543 Partitions |
|---|---|---|---|
| 2T (INTERIOR) | 1B (INTERIOR) | 1T (BORDER) | |
| 3T (INTERIOR) | | 2B (BORDER) | |
| | | 3B (BORDER) | |

Fig. 15B

| 540 Near Edges | 541 Far Edges | 542 Matched Edges | 543 Partitions |
|---|---|---|---|
| | | 1T (BORDER) | |
| | | 1B+2T+3T (INTERIOR) | |
| | | 2B (BORDER) | |
| | | 3B (BORDER) | |

Fig. 15C

| 540 Near Edges | 541 Far Edges | 542 Matched Edges | 543 Partitions |
|---|---|---|---|
| | | 1T (BORDER) | 1T (UNITARY WHOLE) |
| | | 1B+2T+3T (INTERIOR) | 1B+2T+3T (UNITARY WHOLE) |
| | | 2B (BORDER) | 2B (SEGMENT) |
| | | 3B (BORDER) | 3B (SEGMENT) |
| | | | 2B+3B (COMPOSITE WHOLE) |

Fig. 15D

| VERTICAL PARTITION ARRAY | | |
|---|---|---|
| PARTITION | TYPE | REMARKS |
| 721 | SEGMENT | COEXTENSIVE WITH LEFT EDGE OF 710 |
| 722 | SEGMENT | COEXTENSIVE WITH LEFT EDGE OF 711 |
| 723 | COMPOSITE WHOLE | INCLUDES 721, 722 |
| 726 | SEGMENT | INCLUDES LEFT EDGES OF 712 AND 713, AND RIGHT EDGE OF 710 |
| 727 | SEGMENT | COEXTENSIVE WITH RIGHT EDGE OF 711 AND LEFT EDGE OF 714 |
| 728 | COMPOSITE WHOLE | INCLUDES 726, 727 |
| 732 | MULTI-SEGMENT | INCLUDES 729, 730 |
| 734 | MULTI-SEGMENT | INCLUDES 730, 731 |
| 729 | SEGMENT | COEXTENSIVE WITH RIGHT EDGE OF 712 |
| 730 | SEGMENT | COEXTENSIVE WITH RIGHT EDGE OF 713 |
| 731 | SEGMENT | COEXTENSIVE WITH RIGHT EDGE OF 714 |
| 733 | COMPOSITE WHOLE | INCLUDES 729, 730, 731 |

Fig. 19A

| HORIZONTAL PARTITION ARRAY | | |
|---|---|---|
| PARTITION | TYPE | REMARKS |
| 761 | SEGMENT | COEXTENSIVE WITH TOP EDGE OF 710 |
| 762 | SEGMENT | COEXTENSIVE WITH TOP EDGE OF 712 |
| 763 | COMPOSITE WHOLE | INCLUDES 761, 762 |
| 765 | FLANKING SEGMENT | COEXTENSIVE WITH BOTTOM EDGE OF 712, TOP EDGE OF 713 AND WHOLE PARTITION 764 |
| 764 | UNITARY WHOLE | COEXTENSIVE WITH 765 |
| 767 | SEGMENT | COEXTENSIVE WITH BOTTOM EDGE OF 710 AND TOP EDGE OF 711 |
| 766 | SEGMENT | COEXTENSIVE WITH BOTTOM EDGE OF 713, TOP EDGE OF 714 |
| 768 | COMPOSITE WHOLE | INCLUDES 766, 767 |
| 771 | SEGMENT | COEXTENSIVE WITH BOTTOM EDGE OF 711 |
| 769 | SEGMENT | COEXTENSIVE WITH BOTTOM EDGE OF 714 |
| 770 | COMPOSITE WHOLE | INCLUDES 771, 769 |

Fig. 19B

| CROSS PARTITION ARRAY | | |
|---|---|---|
| PARTITION | TYPE | REMARKS |
| 772 | CROSS PARTITION | INCLUDES WHOLE PARTITIONS 728, 764 |
| 773 | CROSS PARTITION | INCLUDES WHOLE PARTITIONS 728, 768 |

Fig. 19C

NON-OVERLAPPING TILING APPARATUS AND METHOD FOR MULTIPLE WINDOW DISPLAYS

BACKGROUND OF THE INVENTION

1. Field of the Invention

The present invention relates to display systems, including computer displays, with multiple application windows or panes. More particularly, the present invention relates to the management, manipulation, arrangement, creation and deletion of non-overlapping panes in a display system.

2. Discussion of the Related Art

Over the last several years computer user interfaces and software applications have undergone much change. Early character-based user interfaces, such as that of DOS, provided environments in which software application programs would be run serially, one application at a time, with each application using the entire display. More recently, graphical user interfaces (GUIs), such as that of Microsoft Windows, have become common, providing environments in which multiple software applications run simultaneously, sharing portions of the display.

Sharing of a display area among several applications or application regions is typically accomplished by dividing the display area into multiple rectangular regions or windows which can have various sizes and positions. In environments such as Microsoft Windows version 3.1, the individual windows are allowed to overlap other windows such that certain windows will be obscured by or hidden behind foreground windows. This often presents users the problem of trying to find and move between the various windows and applications. Additionally, because each window must be sized, positioned and arranged on an individual basis, it is often difficult, inexpedient and inefficient to arrange and organize convenient layouts of multiple windows. As the number of windows and applications increases, these problems become increasingly significant.

Sharing of a display area among multiple applications or application regions is not only a concern in the implementation of operating systems, but is often a concern in the implementation of application programs. A well known example of this can be found in Microsoft's "Program Manager" included in Windows version 3.1. This program adheres to Microsoft's widely used "Multiple Document Interface" specification (MDI), in which a parent window contains multiple overlapping child windows. In the case of the Program Manager, each of the child windows contains collections of icons which can be selected to start other programs.

Because there tend to be large numbers of windows, and because the child windows are resized and repositioned individually, other windows are frequently overlapped, resulting in their being obscured and sometimes lost. Users commonly struggle with sizing and arranging of the child windows so that each child window can be quickly located and conveniently accessed. This is very often inconvenient for the user, if not frustrating, particularly when there are many child windows to be arranged.

This problem is widespread and designers and implementers of user interfaces have long struggled to find alternatives to and methods for dealing with the awkwardness and difficulty of arranging multiple windows in an overlapped window interface. While various alternatives have been attempted, none has been entirely successful, and this long-felt problem has to date remained unsolved by existing methods.

A not entirely successful alternative to overlapped window interfaces has been non-overlapping tiled interfaces in which multiple windows are displayed in a single plane in such a way that no overlapping of windows occurs. Here, a display area is occupied by a set of rectangular regions or windows and may be separated by partitions. The windows are often referred to as panes or may also be referred to as tiles, screens and panels, among other terms. The partitions between the panes are effectively shared border areas and may not always be visible in a non-overlapping tiled interface. They may also be referred to as splitters or splitbars among other terms. Typically, the entire display area is fully occupied by a combination of panes alone or in combination with partitions, such that no gaps or other subregions of the display area exist.

Single-plane tiling interfaces can reduce or eliminate many of the difficulties of the overlapped window interfaces. The non-overlapping tiled interfaces prevent windows from being obscured and hidden by overlapping windows and provide the user various means for simultaneous resizing and arranging of multiple windows. One of the most common means for doing so is by manipulation of the partitions between panes, allowing the user to adjust the edges of multiple panes at the same time.

While providing these advantages over overlapped window interfaces, however, other disadvantages are introduced by existing single-plane tiling interfaces. In particular, the general free-form arrangement capabilities found in the overlapped window interfaces are not available in existing single-plane tiling mechanisms. Instead, existing single plane tiling interfaces impose various sorts of restrictions and constraints on number of panes, arrangement, relative symmetry, sizing, positioning, ordering and manipulation of panes. Additionally, existing non-overlapping tiling mechanisms are limited in their ability to provide mechanisms for convenient assignment and reassignment of application windows to panes.

Such limitations stem largely from the fact that in overlapped window interfaces, individual windows can be resized and repositioned without affecting placement and sizing of other windows, as windows are allowed to overlap. Non-overlapped tiling mechanisms, on the other hand, are concerned with avoiding overlapping of windows and therefore may automatically resize or reposition neighboring windows when any individual window is resized or repositioned. Such adjustment of non-overlapping neighboring windows is not easily generalized and presents many difficulties for generalized arrangements and configurations of windows. As a result, existing single plane tiling mechanisms introduce various kinds of constraints and limitations in configuration, manipulation and modification of tiled window layouts. As a consequence of this restrictiveness, such existing mechanisms and interfaces are in many regards more limiting and confining than the overlapped window interfaces.

FIG. 1 depicts an example of a pane configuration which could be implemented using a single plane tiled interface. Such a configuration or layout of panes can be created by various existing mechanisms. A screen or display area 1 is divided into four panes 10, 11, 12, 13 by a horizontal partition 21, and a vertical partition 20. The screen containing the panes of a tiled interface may be termed a parent window or a tiler. The individual panes may contain or be associated with application windows, regions or objects which may be termed pane tenants or tenant windows, applications or objects, among other terms.

Partition 20 includes two segment partitions 23, 24 and partition 21 includes two segment partitions 25, 26. Whole partitions, such as partitions 20, 21 may include (that is, be co-located with, so as to include the area of) multiple aligned segment partitions. While whole partitions may be co-located with segment partitions, (e.g., 20 is co-located with 23 and 24), the whole and segment partitions are regarded, managed and manipulated as separate entities by the present invention. Existing non-overlapped tiling mechanisms, however, do not have the ability to separately manage segment and whole partitions, that is, the joined segments. Instead, they operate either exclusively on whole partitions or exclusively on segment partitions.

Whole partitions, such as 20, 21, may include multiple segment partitions and be termed composite whole partitions. Other whole partitions, termed unitary whole partitions, such as 29 of FIG. 2, are neither comprised of smaller segments nor are elements of a larger composite whole partition.

In FIG. 1, the whole partitions 30, 31, 32 and 33 are situated with the tiler's borders and are each composite whole partitions having multiple segment partitions. Partition 30 includes, that is, is co-located with, segment partitions 40, 41; partition 31 includes segment partitions 42, 43; partition 32 includes segment partitions 44, 45; and partition 33 includes segment partitions 46, 47.

Border or exterior partitions, such as 30–33, 40–47 are situated with the tiler's border or frame. Interior partitions, such as 20, 21 and 23–26 are not situated with the tiler's frame. Cross partitions provide for simultaneous management and manipulation of both a horizontal and vertical partition. For instance, a cross partition 22 may be implemented at the intersection of 20, 21.

While the various partitions may be coextensive with or substantially aligned with the edges of individual panes, in this discussion pane edges are treated as separate geometric entities, and are simply the sides of a pane.

Existing single-plane tiling mechanisms demonstrate various degrees of capability and limitations in functionality. They can be best understood by separating them into three categories of functionality: (1) whole-partition mechanisms; (2) multi-level mechanisms; and (3) edge-based mechanisms.

Whole-Partition Mechanisms

Whole-partition mechanisms are characterized by layouts in which whole partitions extend entirely across the display area. The pane configurations are generally in rows and columns of one or more panes, and exhibit matrix or spreadsheet-style symmetry. Whole-partition mechanisms generally provide the ability to manipulate and maneuver whole partitions only and do not provide management or manipulation of segment partitions. As an example, the pane configuration of FIG. 1 could be created and managed by a whole-partition mechanism. Panes 10, 11, 12, 13 would be adjustable and resizable only by manipulation of whole partitions 20, 21. Because segment partitions are not separately managed by whole-partition mechanisms, segment partitions 23, 24, 25, 26 would not be able to be separately manipulated. This limitation results in causing all panes to be resized whenever either of the whole partitions 20, 21 is manipulated. For instance, if pane 10 were widened by moving whole partition 20 to the right, pane 12 would also be widened and both 11 and 13 would additionally be narrowed. Because of basic limitations such as these, whole-partition mechanisms lack the more general facility to alter the relative symmetry and arrangement of panes and partitions.

Spreadsheet programs such as "Microsoft Excel version 5" use such whole-partition mechanisms to divide a spreadsheet into paned viewing areas (by selecting the Window-Split menu option). Here, the rows and columns from disparate portions of the spreadsheet are placed into separate panes. A layout of four panes can be had, separated by two whole partitions and arranged in quadrants similar to the arrangement of FIG. 1. Alternatively, a layout of two panes can be arranged, separated either by a single vertical or a single horizontal partition.

Whole-partition mechanisms are limited in a number of ways. Generally there are no manipulable exterior or border partitions. Partition movement may be restricted in various ways by different implementations of such mechanisms. Pane layouts generally cannot be altered in an ad hoc fashion. Instead, only a certain set of pre-defined layouts is available. These layouts are pre-programmed by the application with certain fixed pane symmetries. Because of this inflexibility the user is restricted from arranging the panes for maximum convenience.

Other limitations stem from the fact that segment partitions are not individually managed or manipulable. Because only whole partitions can be manipulated, adjusting the edge of any single pane causes an entire whole partition to be adjusted. In ram, this results in the resizing and repositioning of all panes abutting the whole partition-namely, an entire row or column and adjacent rows or columns. The effect of this is to greatly restrict the user's ability to individually size and position particular panes without impacting the size and position of many, if not all, other panes in the configuration. Further, because only whole partitions can be adjusted, the relative symmetry between panes remains static and cannot be changed.

Another important limitation of whole-partition mechanisms is that panes cannot be created or deleted individually or in an ad hoc fashion. Instead, entire whole partitions must be created and removed, resulting in the creation and removal of columns or rows of abutting panes to one side of the partition. For instance, in an implementation of the configuration of FIG. 1 by a whole-partition mechanism, no pane can be individually deleted. Instead, if the user wished to delete pane 10, either of the whole partitions 20 or 21 would be required to be deleted as an entirety. Pane 10 could be deleted by removing partition 20, but this would result in the unwanted deletion of pane 12. Alternatively, pane 10 could be deleted by removing partition 21, but this would result in the unwanted deletion of pane 11. If the user then wanted to recreate pane 11, this could only be accomplished, using the whole-partition mechanism, by restoring the removed partition and reestablishing a quadrant layout similar to that of FIG. 1.

Multi-Level Mechanisms

Multi-level mechanisms address some of the shortcomings of the whole-partition mechanisms. In particular, new panes can be added in a non-matrixed fashion. This is done by creating new levels of matrixed panes inside an area occupied by a single pane at a higher or parent level.

FIG. 3 depicts a configuration which could be created by a multi-level mechanism. Here, a parent window is divided into a left and right area by partition 50. The right area includes the single pane 52. The left area includes pane 51, which is further subdivided by partition 60 into two second-level panes 61 and 62. At a first level, panes 51 and 52 are separated by whole partition 50 within the bounds of the parent window. At a second or child level within the bounds of pane 51, panes 61 and 62 are separated by whole partition 60.

The configuration shown in FIG. 2 could also be created using a multi-level mechanism. The screen 2 includes a main window separated into four panes 10–13 as in FIG. 1. Pane 13 has been further subdivided at a lower level by partition 29 into two panes 14, 15. Partition 29 can be moved to adjust the sizes of panes 14, 15 without changing the higher level panes 10–13. Furthermore, additional partitions might be configured at the same level to create a matrix of panes within pane 13. Each partition extends entirely across the next higher level pane in the vertical or horizontal direction.

Unlike a whole-partition mechanism, a multi-level mechanism can be constructed such that the requirements of matrix can be worked around to give the user alternative layout options. However, while the multi-level mechanism improves on some of the shortcomings of the whole-partition mechanisms, it does not do so in a general way, and many significant limitations remain resulting in inflexible mechanisms. Generally there is no provision for manipulable exterior (border) partitions. Different layouts can be constructed only if pre-programmed in the software, and no ad hoc mechanisms are provided for generalized creation, deletion and flexible placement of panes and partitions.

Whole-partition mechanisms may provide the ability to simultaneously manipulate both horizontal and vertical partitions. For instance, in the configuration of FIG. 1, the user might be able to simultaneously manipulate both partitions 20 and 21 by selecting cross partition 22 at the intersection between the two partitions. Existing multi-level mechanisms are often unable to provide this capability for partitions at different levels, even when intersecting. Thus, a single horizontal partition (21 in FIG. 2) at a first level cannot be manipulated at the same time as a lower level vertical partition (29 in FIG. 2).

A single configuration or pane layout can be formed using different mechanisms. However, the functionality, manipulation capabilities and limitations differ depending on how the layout was created with either single or multi-level mechanisms. For example, the configuration of FIG. 1 can be created in a variety of ways. With a whole-partition mechanism, the layout includes a vertical partition 20 and a horizontal partition 21. None of the segments 23, 24, 25, 26 are individually managed or manipulable.

The same layout can be obtained in a multi-level mechanism using a single horizontal partition 21 at a first level, and two distinct partitions 23, 24 at a second level. In the single level mechanism, the vertical partition 20 can be manipulated so as to horizontally resize all panes 10–13 simultaneously. However, in the multi-level mechanism, the two vertical partitions 23, 24 cannot be joined or manipulated together. That is, multi-level mechanisms have no capability to join separate segment partitions such as 23, 24 for simultaneous management or manipulation.

Thus, movement of partition 24 would only resize the lower panes 12, 13, and would not simultaneously manipulate partition 23 so as to resize the upper panes 10, 11. Additionally, the horizontal partition 21 can only be manipulated as a whole in either mechanism. Since the horizontal partition is at the first level, it cannot be separated into distinct partitions 25, 26.

Thus, the existing mechanisms have neither the ability to separate a single partition into segments so as to be managed and manipulated individually nor to join individual aligned partitions so as to be managed and manipulated as a whole. The effect of this is to significantly constrain the range of movement of panes and to limit the user's ability to conveniently and arbitrarily resize and reposition panes.

Multi-level mechanisms can somewhat increase the flexibility of whole-partition mechanisms by relaxing matrix symmetry requirements. Once created at a given level, however, the symmetric organization of panes remains static and unchangeable at that level. For instance, in the multi-level configuration of FIG. 1 just discussed, panes 10 and 11 are separated by partition 23 and are together managed at a child level. The child level's area is bounded at the top by the parent window's boundary, and at the bottom by whole partition 21, neither of which can be separated into segments. As a consequence, panes 10 and 11 must always have vertically equivalent positions, and will always be symmetric in this regard. Pane symmetry will be preserved and inflexible on either side of any existing partition, and there is no automatic mechanism for altering this.

Multi-level mechanisms furthermore restrict the range of motion of panes and partitions at lower levels. Because a lower level mechanism is bounded by the partitions and boundaries of a higher level, the lower level's panes and partitions are confined within those boundaries. For instance, a multi-level mechanism may be used for the configuration of FIG. 2, in which panes 14 and 15 are managed at a child level and separated by partition 29, also at the child level. The child level's bounds are those of pane 13, that is, whole partition 21 at the top, whole partition 20 on the left, and the parent window's boundaries at the right and bottom. Neither of the panes 14, 15 can be resized or repositioned outside these bounds, and movement of partition 29 is similarly confined. It is only by altering the child level's boundaries that any further movement of 14, 15 or 29 can occur.

Edge-Based Mechanisms

The text editor software "Brief" (version 3.1) provides an example of a third existing mechanism for non-overlapped tiling interfaces, the edge-based mechanism. Unlike the whole-partition and multi-level mechanisms, this mechanism provides for movement of individual pane edges only and does not provide for management of either composite whole partitions or cross partitions.

Were the configuration of FIG. 1 to be implemented by an edge-based mechanism, the interface's capabilities and limitations would be significantly different from those of either a whole-partition or multi-level implementation of the same configuration. As edge-based mechanisms deal exclusively with the individual edges of panes, only the segment partitions 23, 24, 25 and 26 would be managed or manipulable. Because the edge-based mechanisms have no ability to combine and manage multiple aligned segment partitions as composite whole partitions, neither of the whole partitions 20, 21 would be managed or manipulable The difference in behavior and functionality is significant. The configuration of FIG. 4 could be obtained by moving segment partition 23 of FIG. 1 to the left to form partition 27, and by moving segment partition 24 to the right to form partition 28. This configuration has altered the relative symmetry between panes 10 and 12 and between panes 11 and 13. Alternatively, either of the two horizontal segment partitions 25, 26 could have been moved, creating a completely different layout. By providing manipulation of segment partitions, edge-based mechanisms provide for finer control of layouts, dynamic pane symmetry, and the ability to create ad hoc configurations.

Known edge-based mechanisms have significant limitations, however, including the inability to join or consolidate segment partitions into whole partitions. Thus, neither partition 20 nor 21 of FIG. 1 would be implemented, managed or manipulable by such an edge-based mechanism. Because of this, there is no means for resizing an individual pane while maintaining its relative symmetry with surrounding panes. Also, while whole-partition mechanisms commonly provide for simultaneous manipulation of both horizontal and vertical partitions, known edge-based mechanisms do not do so. That is, edge-based mechanisms do not implement cross partitions, such as 22, and vertical and horizontal partitions, such as 20, 21, cannot be simultaneously moved.

Known examples of edge-based mechanisms exhibit other important limitations. Wherever a single pane edge is not evenly aligned with one or more opposite edges of other panes, partition movement is not implemented. Thus, in a configuration such as that of FIG. 4, the horizontal partition 21 is not manipulable. This results in the inability to vertically resize any of the panes. In effect, various layouts cause panes to become locked or positionally frozen in one or more dimensions.

Known edge-based mechanisms also limit the range of movement of partitions, such that a partition's movement is confined to the area of the surrounding panes. For example, in an edge-based implementation of FIG. 2, partition 29 cannot be moved to the left of partition 24. Known edge-based are not implemented for graphical user interfaces, nor are they fully responsive to mouse or pointer device manipulation. They fail to provide manipulation of border partitions. They fail to include the ability to scroll panes when their combined extent exceeds the display width of the parent window.

Thus, while edge-based mechanisms provide seemingly greater flexibility in arrangement of the pane layout than either the whole-partition or multi-level mechanisms, they suffer from a number of flaws and limitations.

While the various existing mechanisms show a wide variety of capabilities, one desirable capability which is not found in the prior art is the ability to install a non-overlapped tiling interface upon a pre-existing overlapped window interface. That is, the existing mechanisms lack the ability to take over the window placement control of an overlapped window interface so as to convert it to a single-plane tiling interface with the existing windows of the original interface. Rather, existing single-plane tiling interfaces must be explicitly developed and independently started and no means exists for transferring window control from an overlapped window interface to a non-overlapping single-plane mechanism.

A number of limitations and deficiencies are apparent in both overlapped and existing non-overlapped interfaces. Overlapped window interfaces cause windows to be obscured or lost, and make it difficult for the user to navigate among multiple windows, thereby restricting the user's ability to effectively operate and interact with the computer. While overlapped mechanisms provide free-form arrangement, they fall short in not providing convenient organization or multiple windows.

Existing single-plane tiled interfaces, on the other hand, do not allow overlapping windows to obscure or hide any of the other panes. However, while existing non-overlapped mechanisms provide organization and arrangement of multiple windows, they variously lock or freeze symmetries between panes, pane sizing and manipulation alternatives, and fail to provide general free-form manipulation.

Software users have long desired a method for convenient organization and unimpeded arrangement of multiple application windows. This desire has long been apparent but remains unsolved by known art.

Therefore, a need exists for a non-overlapping single-plane tiled user interface which eliminates the restrictiveness of existing single-plane tiled interfaces. In particular, such a single-plane tiled interface:

1 could provide greater free-form arrangement of panes;

1 could provide management and manipulation of both segment partitions and whole partitions;

1 could allow discrete selection of segment partitions and whole partitions;

1 might not require panes to be arranged with any particular symmetry;

1 could provide for ad hoc creation, deletion and hiding of panes on an individual basis;

1 might not restrict or limit partition movement;

1 could provide for simultaneous movement of both vertical and horizontal partitions;

1 could permit any individual pane to be resized in either the vertical or horizontal dimension without regard to the layout or configuration of the tiler;

1 could be able to collapse panes to a minimum width or height in order to facilitate resizing of other panes and movement of other partitions;

1 could allow scrolling for arrangements of panes where the panes' extent exceeds the display area of the tiler;

1 could provide for auto-alignment of partitions;

1 could provide for arrangement of panes in certain predefined and convenient configurations;

1 could be able to save and restore particular layouts of panes;

1 could conveniently associate and reassociate applications and application regions with particular panes; and 1 could be able to be installed as a non-native interface in a pre-existing, already-running overlapped window interface so as to control window positioning.

SUMMARY OF THE INVENTION

The deficiencies of existing interfaces are substantially overcome by the present invention which provides an interface for management and manipulation of non-overlapping windows. According to one aspect of the invention, a user interface includes multiple non-overlapping panes separated by partitions, which are individually moveable so as to effect resizing or movement of abutting panes. The configuration or layout of panes does not require or necessarily exhibit any particular symmetry, any parent-child relationship, or any other fixed relationship among panes. Multiple aligned segment partitions can be selected for simultaneously resizing adjacent panes. Intersecting vertical and horizontal partitions can be selected together for simultaneous resizing of panes in two dimensions. Partitions may be formed of multiple segment partitions which are substantially aligned. Segment partitions, cross partitions and whole partitions may be distinctly displayed and discretely selected.

According to another aspect of the invention, any pane may be resized in any dimension without regard to the layout or configuration of panes. Partition movement is not restricted by the dimensions of the surrounding panes. Instead, surrounding panes may be automatically adjusted in size or location, or collapsed to a minimum size and repositioned so as to accommodate such movement. Such collapsing and repositioning of panes occurs successively such that extreme movement of a particular partition may cause a neighboring pane to be collapsed and repositioned and this may in turn cause one of its neighboring panes to be collapsed and repositioned, etc.

According to a further aspect of the invention, the interface may include multiple sets of pane configurations. Pane configurations may also be created to extend beyond the display area's boundaries, with scrolling in either the vertical or horizontal dimensions.

According to another aspect of the invention, tenant application regions, windows or objects can be associated with any panes in the interface, or alternatively, panes may be untenanted. Tenant application regions can also be moved from one pane to another. Panes may be hidden and automatically resized to predefined configurations. Additionally, the interface can be integrated with existing interfaces to provide additional functionality.

According to another aspect of the present invention, the features of tilers, panes and partitions can be altered. Title bars, function buttons, background, text, partitions and partition pickup or selection regions can be varied in size, color and appearance.

With these and other objects, advantages and features of the invention that may become apparent, the nature of the invention may be more clearly understood by reference to the following detailed description of the invention, the appended claims and the several drawings attached hereto.

BRIEF DESCRIPTION OF THE DRAWINGS

FIGS. 14A–14D illustrate the operation of work arrays in creating a vertical partition array for the configuration of FIG. 8.

FIGS. 15A–15D illustrate the operation of work arrays in creating a horizontal partition array for the configuration of FIG. 8.

FIGS. 19A–19C illustrate partition arrays for the configuration of FIG. 18.

DETAILED DESCRIPTION OF PREFERRED EMBODIMENTS

Figure 5:
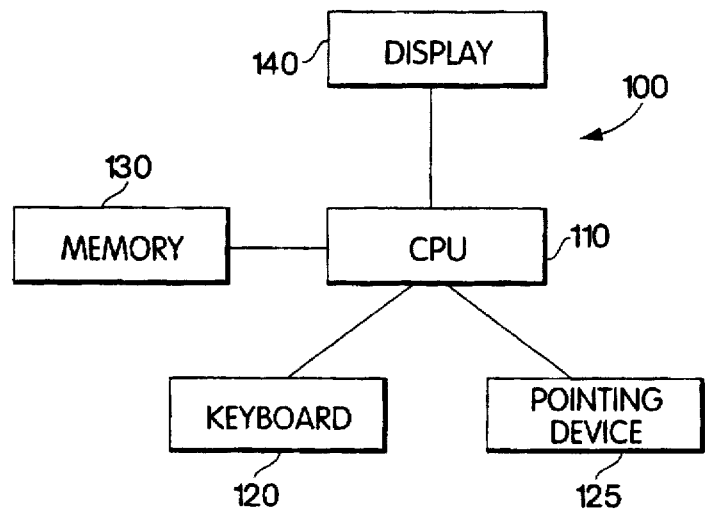
FIG. 5 is an illustration of computer hardware for which the interface of the present invention may be implemented.

Referring now in detail to the drawings wherein like reference numerals represent like elements, there is illustrated in FIG. 5, computer hardware 100 for implementation of a preferred embodiment of the present invention. The computer hardware 100 includes a central processing unit (CPU) 110 for executing program instructions. The program instructions may include one or more application programs and instructions representing the interface of the present invention. The CPU may include more than one processor operating simultaneously. The program instructions and data used in executing the instructions are stored in a memory 130 connected to the CPU 110, which may include one or more of RAM, ROM, magnetic disk, magnetic tape, cache memory, or other memory storage device. A user inputs information to manipulate the interface or operate applications through a keyboard 120 or pointing device 125 such as a mouse connected to the CPU 110. Information is output on a display 140 for communication to the user. The present invention relates to an interface which defines the presentation of the information on the display 140. The invention is not limited to software implementations nor is it limited to displays for general purpose computers. It could also be applied, for example, to an audio-visual device or a television set for simultaneous display of different programs in non-overlapping panes.

Figure 6:
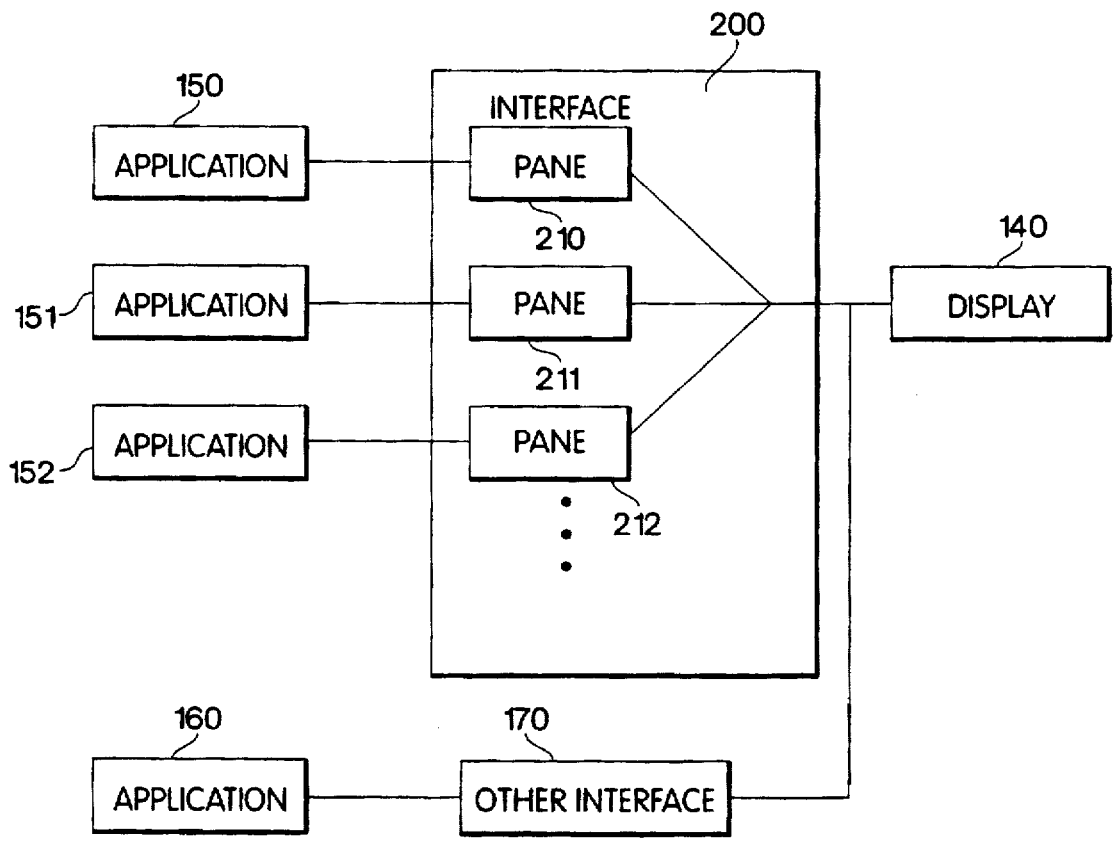
FIG. 6 illustrates operation of the interface of the present invention in conjunction with applications and other interfaces.

FIG. 6 illustrates the operation of the interface 200 of the present invention in connection with applications 150, 151, 152, which are associated with panes 210, 211, 212, respectively. The interface 200 controls the position, size and appearance of the panes and correlates application regions to the display regions defined by the panes. Additionally, other interfaces 170 may also be operating simultaneously in connection with different applications 160. These interfaces may be hidden or may occupy certain portions of the display 140. Thus, the non-overlapping interface 200 can be coordinated with existing systems.

Pane and Partition Manipulation

The interface 200 of the present invention permits the creation, management and manipulation of panes, whole partitions, segment partitions and cross partitions unrestricted by and without requiring any fixed pane layout or symmetry. By way of example, the configuration of panes shown in FIG. 1 could be created using the interface 200. However, unlike existing mechanisms, each whole partition and each segment partition can be individually managed by the present invention and can be discretely selected and manipulated by the user.

Whole partitions 20, 21 can each be moved to resize all panes horizontally or vertically, respectively. Additionally, segment partitions 23, 24, 25, 26, which are co-located with 20, 21, can be separately managed by the present invention and can be individually selected and manipulated to resize only the abutting panes. Thus, when segment partition 23 is moved, only the upper panes 10, 11, are affected, and the lower panes 12, 13 are not altered. When segment partition 25 is moved, only the left-hand panes 10 and 12 are adjusted, and the right-hand panes are unaffected.

The present invention may also provide management of cross partitions, such that a cross partition 22, formed at the intersection of partitions 20, 21 can be manipulated to resize panes in both the horizontal and vertical directions simultaneously. Further, all of the exterior whole partitions 30–33 and all of the exterior segment partitions 40–47, can be managed by the invention and can be selected and manipulated by the user. According to one embodiment of the invention, when such exterior partitions are moved toward the interior of the tiler, new panes are automatically created.

Figure 2:
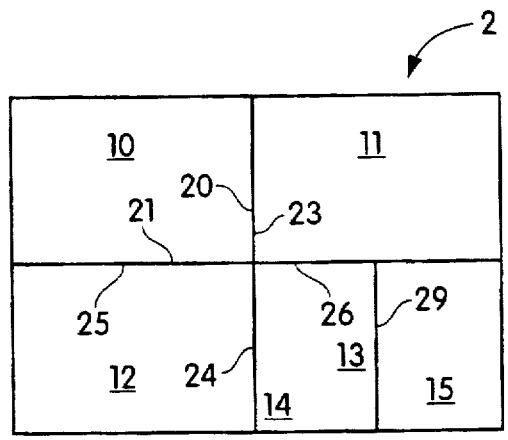
FIG. 2 is an illustration of a second non-overlapping pane configuration.
Figure 3:
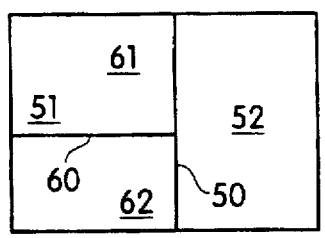
FIG. 3 is an illustration of a third non-overlapping pane configuration.
Figure 4:
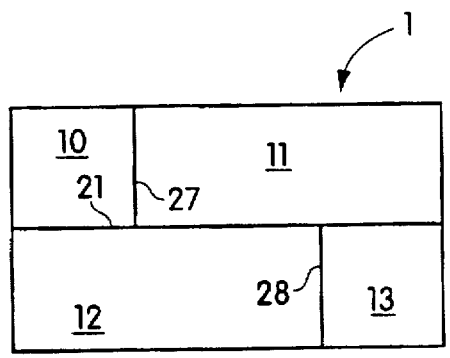
FIG. 4 is an illustration of a fourth non-overlapping pane configuration.

Manipulation of whole partitions, segment partitions or cross partitions is also not restricted by other partitions. For example, in the configuration of FIG. 2, partition 29 can be moved to the left past partition 24. In such a movement, partition 24 is consequently moved to accommodate the manipulation of partition 29. Alternatively, when partition 29 is moved to the left, the whole partition 20 can be consequently moved to accommodate the movement. Additionally, means exist for selecting whether whole or segment partitions are consequently moved. Further, if there were additional partitions and panes to the left of partition 20, they would also be automatically moved to accommodate the movement of partition 29.

Movement of cross partitions is also unconstrained. For instance, movement of the cross partition 22 at the intersection of 20 and 21 or movement of the cross partition at the intersection of 21 and 29 of FIG. 2 would cause automatic shifting and consequent movement of both horizontal and vertical partitions and automatic resizing of other panes to accommodate the movement. Thus, the interface 200 permits completely independent manipulation of whole, segment and cross partitions so as to effect convenient free-form sizing and positioning of panes, unconstrained by and without regard to fixed layouts or symmetries.

Any particular pane layout can be arrived at through any number of different individual adjustments, manipulations and sequences of prior arrangements of panes and partitions. The capabilities of the interface, however, are not restricted by the sequence of steps used to create a given layout, and manipulation alternatives are the same for equivalent layouts no matter how arrived at.

Figure 1:
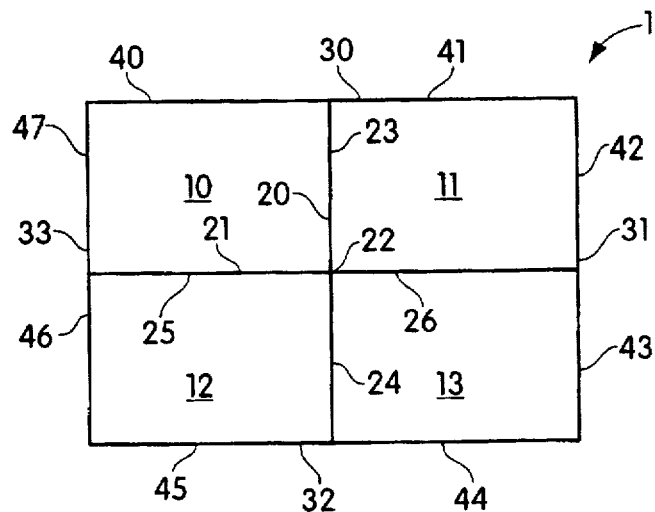
FIG. 1 is an illustration of a first non-overlapping pane configuration.
Figure 7A:
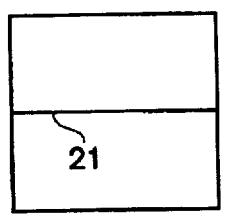
FIGS. 7A–7F illustrate different processes for forming the configuration of FIG. 1.
Figure 7D:
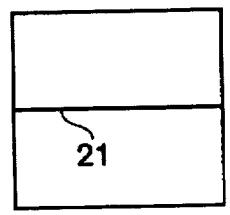
Figure 7B:
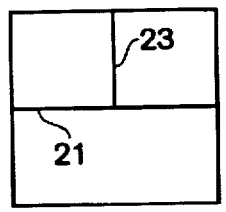
Figure 7E:
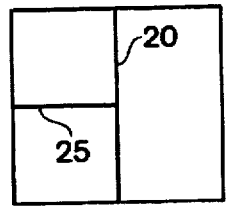
Figure 7C:
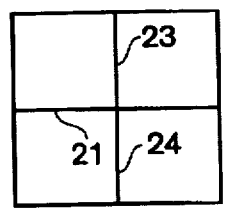

For example, the configuration in FIG. 1 can be created from a single-paned tiler, as illustrated in FIGS. 7A–7C, by adding a horizontal partition 21, adding a first vertical segment partition 23, and adding a second vertical segment partition 24 aligned with segment partition 23 to create partition 20.

Figure 7F:
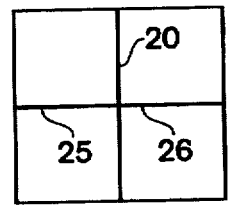

Alternatively, as illustrated in FIGS. 7D–7F, the configuration could also be created by first adding a horizontal partition 21. Next, the addition of a vertical partition 20 causes the extent of 21 (of FIG. 1) to be reduced (to form partition 25) and creates a single right-hand pane encompassing the area of panes 11, 13. Finally, the addition of a horizontal partition 26 causes the creation of another pane, and brings partitions 25 and 26 into alignment such that 25 and 26 are segment partitions and together create the composite whole partition 21 as illustrated in FIG. 16F. In another alternative sequence, the configuration of FIG. 1 could be generated in one or two steps by adding partitions 20 and 21 either individually or both at once, to divide the tiler into the quadrants of FIG. 1.

Many other different series of steps and intermediate configurations could be used to create the configuration of FIG. 1. Unlike existing systems, though, the functionality of the interface is not affected by the method or sequence of the configuration's creation. Regardless of the creation sequence, when the present invention is used to implement the configuration of FIG. 1, not only can the two composite whole partitions 20, 21 be individually managed for display, selection and manipulation, but the segment partitions 23, 24, 25, 26, cross partition 22 and all the exterior partitions 30–33 and 40–47 can also be individually managed.

Existing mechanisms are much more limited. Existing whole-partition mechanisms provide for manipulation of the whole partitions 20 and 21 only; existing edge-based mechanisms provide for manipulation of segment partitions 23, 24, 25 and 26 only; and existing multi-level mechanisms provide for manipulation of one whole and two segment partitions only, depending on the configuration of a predefined layout—either the partitions 20, 25 and 26, or the partitions 21, 23 and 24.

The present invention may in part be distinguished from existing mechanisms by its ability to simultaneously manage both segment and composite whole partitions. The invention may also in part be distinguished from existing mechanisms by the range of movement, sizing and adjustment it affords to particular sets of panes.

In the four quadrant configuration of FIG. 1, any pane can be adjusted with either a horizontally opposite or a vertically opposite pane, such that no other panes are affected. Additionally any pane can be collectively adjusted with the other three panes (including the diagonally opposite pane) either vertically or horizontally. Thus, pane 10 may be adjusted with pane 11 only, without affecting the bottom panes 12, 13, by manipulation of segment partition 23. Pane 10 may also be adjusted with pane 12 only, without affecting the right hand panes 11, 13, by manipulation of segment partition 25. Pane 10 may also be adjusted either horizontally or vertically along with all the other three panes by manipulating the whole partitions 20, 21 respectively, or alternatively, by manipulating cross partition 22.

Existing art is variously limited according to this understanding of the present invention. Whole-partition mechanisms are able to adjust all four panes at once, but are unable to provide means for adjusting either 10 and 11 only or 10 and 12 only. Multi-level mechanisms are able to provide means for adjusting all four panes collectively, and are also able to provide means for adjusting 10 and 11 only, or 10 and 12 only, but not both sets. Edge-based mechanisms are able to adjust 10 and 11 only, or 10 and 12 only, but have no means for adjusting all panes collectively.

In addition to the above capabilities, the present invention may also provide implementation of cross partitions for simultaneous management and manipulation of both horizontal and vertical partitions, as well as exterior whole and segment partitions, 30–33 and 40–47. Further, the present invention can provide for the ad hoc creation and removal of panes and partitions. The present invention can provide such capabilities for any number of panes and partitions, in any non-overlapped configuration without regard to and without being restricted by any fixed or predefined symmetry, parent-child or other special relationship between individual panes.

Data Structures

Figure 8:
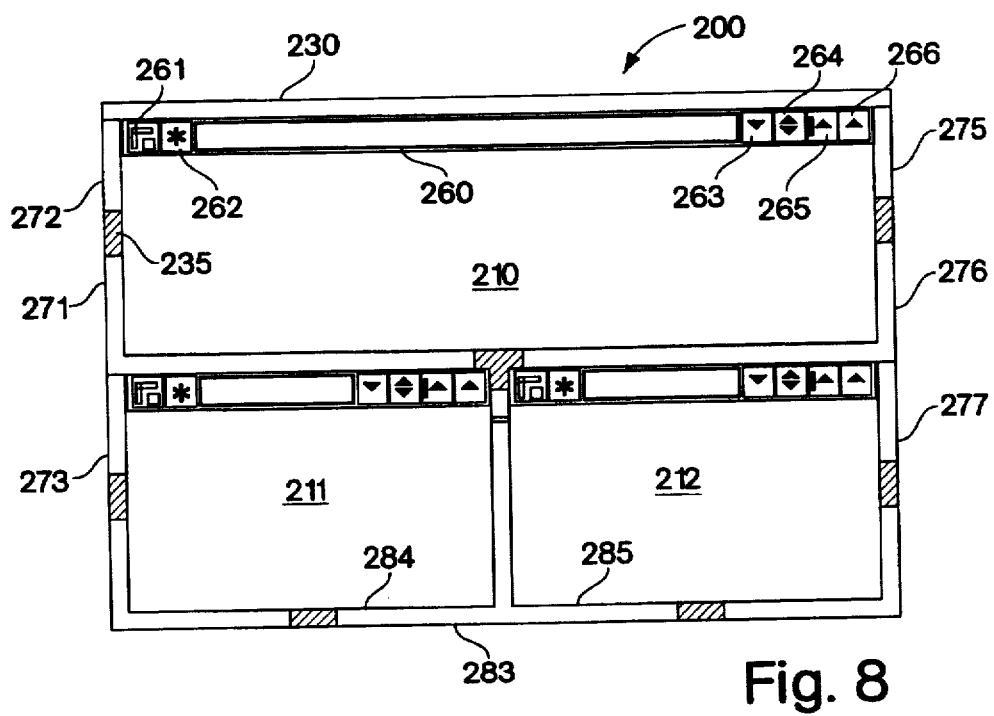
FIG. 8 illustrates a configuration of panes in an interface according to an embodiment of the present invention.
Figure 9:
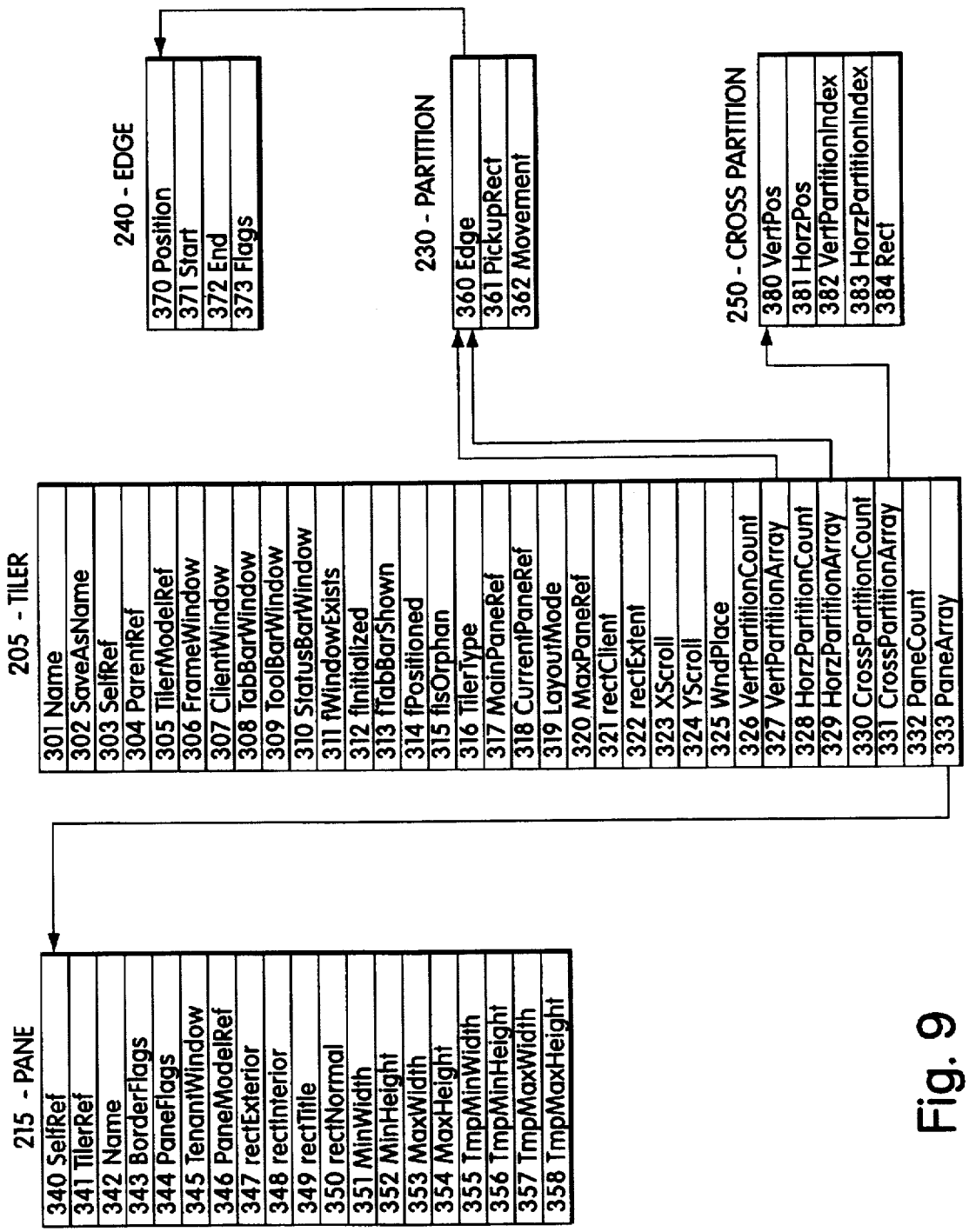
FIG. 9 illustrates data structures in conjunction with an embodiment of the present invention.

FIG. 8 shows a configuration for three panes 210, 211, 212 of the interface 200 which will be used in describing the structure and operation of the interface 200. FIG. 9 illustrates the data structures for describing and controlling the panes and partitions between panes in a preferred embodiment of the present invention. The tiler data structure 205 defines a pane configuration in the interface. More than one tiler 205 may be created and used simultaneously. Tilers may be included in or form conventional overlapped and non-overlapped windows which can be managed with other windows and incorporated into other overlapped or non-overlapped interfaces. Each tiler defines a specific dynamically changeable pane configuration and includes identifiers, flags and data 301-333 for representing the tiler on the display. Such information may include a name 301 for the tiler and references to the screen and tiler dimensions 321, 322 and scrolling 323, 324. More particularly, the tiler structure includes vertical and horizontal partition arrays 327, 329, a cross partition array 331 and a pane array 333.

The pane array 333 includes one or more pane data structures 215 in an array format. The pane data structure 215 includes: a pane name 340; a reference 341 to the tiler 205 to which the pane belongs; a reference 345 to the tenant application object associated with the pane; and rectangular dimensions of the pane's exterior extent 347, interior extent 348, and title bar 349. The rectangular dimensions of a normal position 350 for the pane is also part of the data structure. The normal position 350 is used when the pane is changed from a maximized, minimized or hidden state back to a normal position. Two sets of flags indicate attributes of the pane. Border flags 343 indicate whether the edges of the pane are situated with the tiler's borders. Pane flags 344 indicate whether the pane is maximized, shown, hidden, a principal pane for the tiler or an initial predefined pane.

Figure 10:
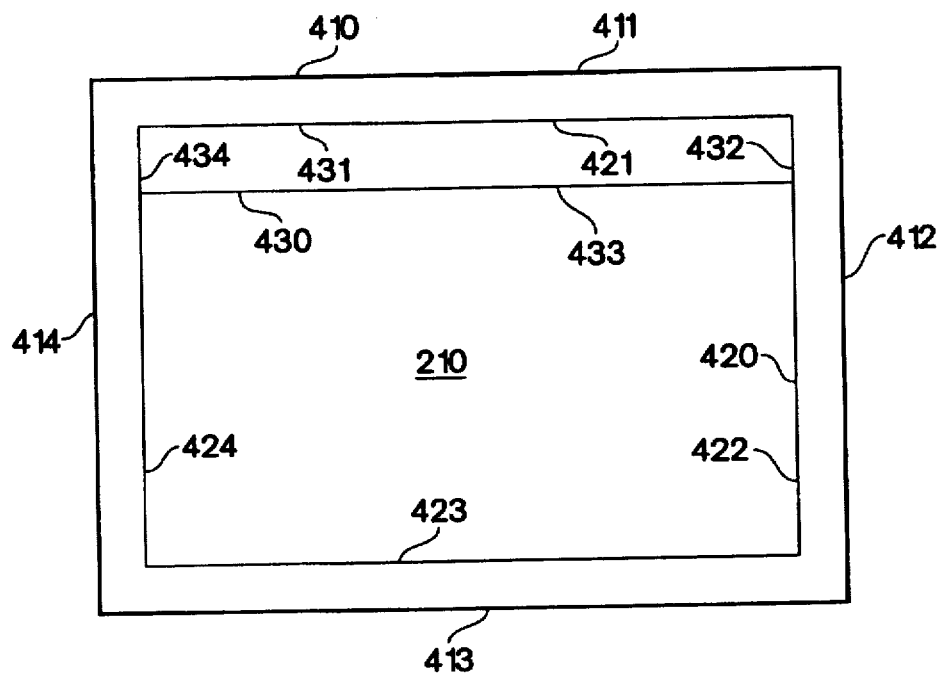
FIG. 10 illustrates dimensions of a pane.

The rectangular dimensions of a pane 210 are illustrated in FIG. 10. The exterior rectangle dimensions 347 define a rectangle 410 with the position of the four sides or edges 411-414 of the pane. Panes of a tiler are maintained in non-overlapping fashion by co-locating sides of exterior rectangles 411-414 of adjacent panes. Alternatively, additional buffer areas and gaps between panes may also be used, or certain portions of panes may be allowed to overlap without causing substantial overlapping of pane contents.

The interior rectangle dimensions 348 define a rectangle 420 for an application window with the position of the four sides 421-424. A title bar rectangle 430 may be cut out of the interior rectangle. As shown in FIG. 8, the title bar may include the title 260 as well as various other function buttons 261-266. Function buttons can be used to perform functions, such as selection of a specific application to be placed in and associated with a pane; application-specific options and menus; maximizing, minimizing or hiding a pane; and resetting a pane to a normal position.

Partitions between panes are defined by the partition data structure 230. This data structure is identical for vertical and horizontal partitions, which are maintained in separate arrays 327, 329 of the tiler 205. The partition data structure 230 includes an edge definition 360, a pickup and display rectangle 361 and a movement amount 362 which can be used during partition manipulation. The pickup rectangle corresponds to a hotspot or mouse-sensitive area which can be used for selection and display of a partition. Partition display areas may be situated in the spaces between interior rectangles 348 of adjacent panes.

While the edge data structure 240 may correspond to the edge of a pane, it is also used to define various other edges and lines. It includes a line's position or location 370, which corresponds to the x coordinate for vertical lines and the y coordinate for horizontal lines. The start value 371, and end value 372, correspond to top and bottom end points for vertical lines and left and right end points for horizontal lines. A set of flags 373 are used to define the location of the edge relative to a pane (top, left, right, bottom) or tiler border. When an edge data structure 240 is contained or referenced by a partition data structure 230, the flags 373 may also serve to define partition attributes or types of partitions, such as whole, segment or multi-segment partitions.

The cross partition array 331 defines intersections between partitions. Cross partitions are used for simultaneous movement of horizontal and vertical partitions. The cross partition data structure 250 includes the position 380, 381; indices to the intersecting horizontal and vertical partitions 382, 383 in the corresponding horizontal and vertical partition arrays 327, 329; and a pickup and display rectangle 384.

Pane Layout Modification Cycle

A tiler of the present invention includes a layout of non-overlapped panes which can be altered by the user in various ways to effect a new layout. Layout alterations may be done successively and in a sequence or cycle of steps.

Figure 11:
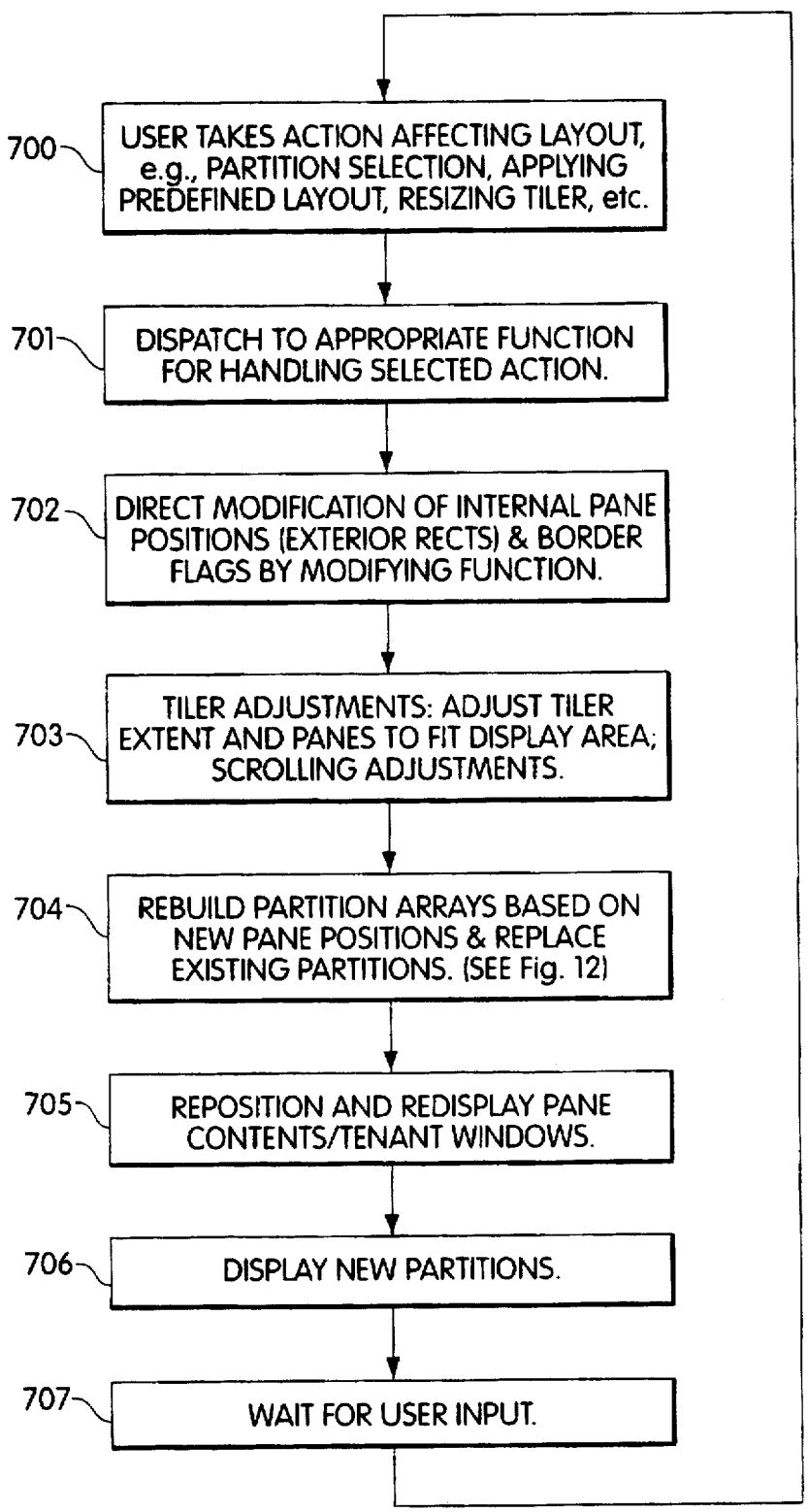
FIG. 11 is a block flow diagram of the layout modification process.

FIG. 11 is a block flow diagram which indicates the major steps in a layout modification sequence. At step 700, the user initiates an action which affects the layout of panes in the tiler. Such an action may include partition movement, pane creation, deletion or hiding, resetting of partition parameters such as thickness, auto-alignment or other attributes, or rearranging the layout to one of several predefined layouts or layout styles, among others. At step 701, handling of the initiated action is dispatched to the appropriate handling function, such as a partition manipulation function or a pane arrangement function. At step 702, the handling function directly alters the external rectangles 347 (the position within the tiler) and border flags of affected panes. For example, when the user has finished repositioning a partition, the function handling partition movement modifies the external rectangles of panes on either side of the repositioned partition.

At step 703, adjustments are made to accommodate a tiler's extent to its display area. Step 703 may further include resetting of the tiler's scrolling parameters to provide scrolled access to portions of the tiler's extent outside the visible display area. At step 704, and as shown in greater detail in FIG. 12, the vertical, horizontal and cross partition arrays of the tiler, 327, 329, 331, are entirely rebuilt based on the new pane positions and parameters and replace all prior partitions. Once new partition arrays have been constructed, the pane tenants, that is, the application windows or application regions residing within the panes, are repositioned and redisplayed, as indicated at step 705. At step 706, the newly built partitions themselves are displayed. At step 707, the system waits for new user input which may cause additional layout modification by a variety of means and thus, re-execution of the sequence starting at step 700.

Throughout the layout modification cycle, the contents of a tiler's pane array 333 remain constant, except when new panes are added to the tiler or when existing panes are deleted. When a pane is hidden, a flag 344 is cleared to indicate that it is no longer shown, rather than removing the pane from the pane array. While the pane array's contents remain relatively static, the contents of the vertical, horizontal and cross partition arrays, 327, 329, 331, are rebuilt (step 704) with every modification to the tiler's layout.

In a preferred embodiment, the operation of the interface relies on exact alignment and matching of pane edges. Because of this, any slight change in alignment and location of pane edges may require reanalysis and reconstruction of partition arrays. Thus, the partition arrays are discarded and new partition arrays are constructed after any partition movement, rearrangement, deletion, hiding, showing or resizing of panes within the tiler, swapping of pane positions, alteration of partition thickness, changing of auto-alignment parameters, minimum pane width or height, or other partition, pane or tiler attributes. Reconstruction of the partition arrays also occurs after the tiler is resized, its contents are scrolled, predefined layouts are applied, application-specific actions are performed, a tab bar or other auxiliary frame windows are shown or hidden, and various other modifications which affect the layout.

Construction of Partition Arrays

The present invention provides manipulation of non-overlapping panes. According to an embodiment of the invention, pane manipulation can be effected by reference to and manipulation of partitions aligned with the panes. Partition arrays 327, 329, 331 are constructed and maintained to afford such movement and manipulation of panes.

Figure 12:
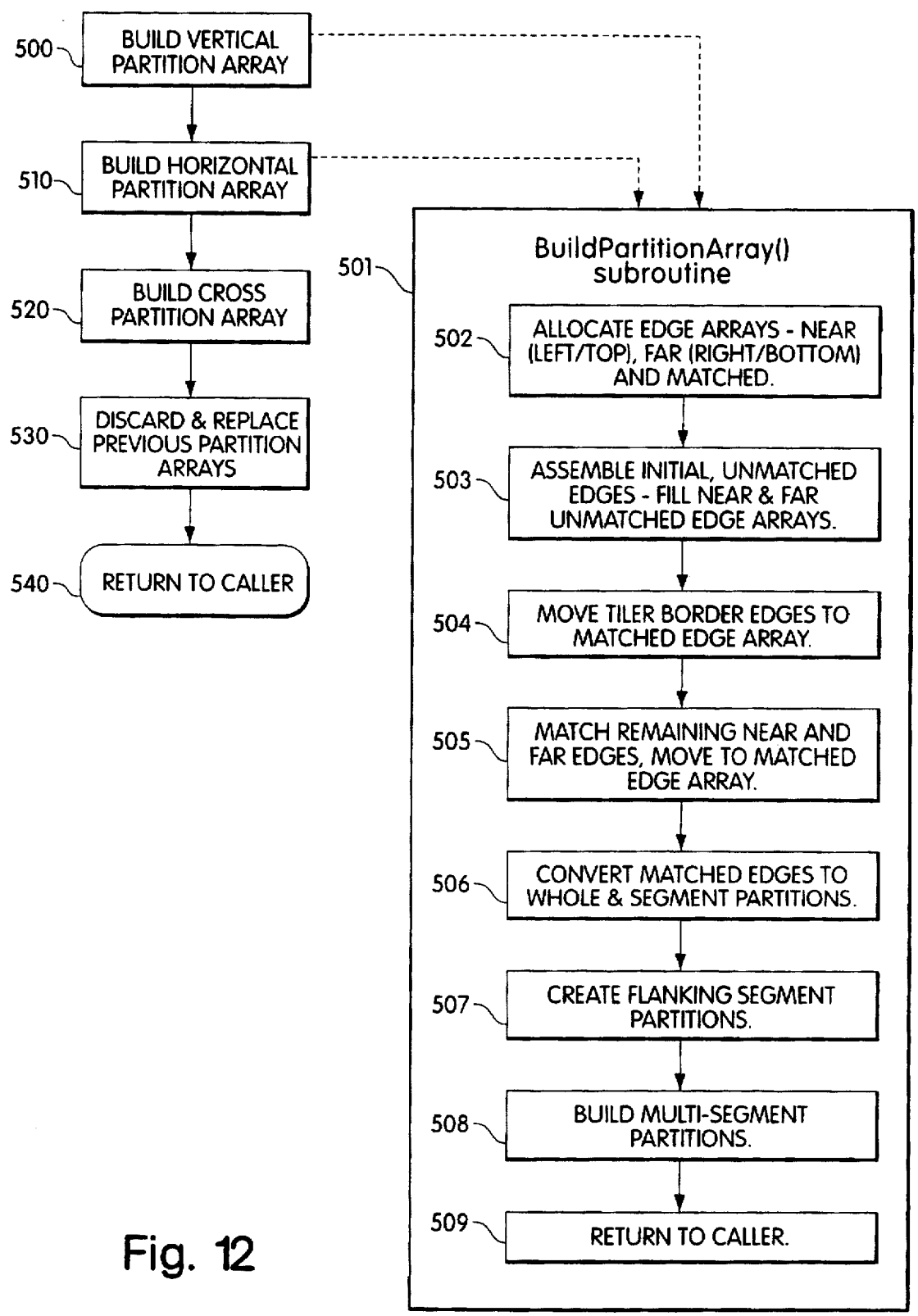
FIG. 12 is a block flow diagram of a process for creating partition arrays.

The process of constructing partition arrays, which is invoked at step 704 of FIG. 11, is illustrated in FIG. 12. At the point at which the actions of FIG. 12 are executed, modification to the tiler's layout has occurred (steps 700, 701), the external rectangles 347 of the panes have been modified (step 702) and adjustments to the tiler's extent have taken place (step 703). At step 500 of FIG. 12, the vertical partition array is created, followed by creation of the horizontal partition array (step 510). At step 520, cross partitions are formed by examining the intersections of the vertical and horizontal partitions and are stored in an array. At step 530, the tiler's previous partition arrays are discarded and are replaced by the new partition arrays, and the partition construction process concludes at step 540, by returning to the caller. Subsequent processing, as shown in FIG. 11, causes repositioning and redisplay of pane tenants (step 705), and redisplay of the newly built partitions (step 706) before awaiting the next layout-modifying action (step 707).

The construction of partition arrays is centered on the identification of which combinations of pane edges are aligned so as to allow them to be jointly managed as partitions. This process is called edge matching and seeks to identify the smallest groupings of edges that can be managed and manipulated together. In effect, this results in the identification of the smallest groupings of panes which can be moved or resized together.

A pane edge is a simple geometric entity representing one of the four sides of a pane. A partition, though, is more complex and may represent a correlation of panes and their edges. While a single pane edge may be used to form one or more partitions, partitions may also be composed of multiple pane edges. For instance, the right edge of pane 10 in FIG. 1 may be used in the formation of segment partition 23, composite whole partition 20 and cross partition 22. In contrast, composite whole partition 20 aggregates four edges—the left edges of panes 11 and 13 and the right edges of panes 10 and 12.

A partition, moreover, can be managed by the interface as a data structure which may be moveable and alterable, and which may have different kinds of characteristics and functionality. As a data structure, it may further provide the basis for implementation of various kinds of user interface devices. In the present invention, these user interface devices are also termed partitions, but in the following discussion it should be clear from the context whether the data structure or the user interface device is indicated. Such partition user interface devices may be selectable and manipulable by the user so as to alter the pane configuration. The invention, however, does not require such user interface devices, nor do partitions necessarily have to be visible. Instead, various alternative methods can be used to effect modifications to pane layouts.

There is little difference in the method for building vertical and horizontal partitions. Because of this, the same partition construction subroutine 501 can be used in separate passes—vertical edges are considered in a first pass (step 500), and horizontal edges in a second pass (step 510). Alternatively, separate routines could be used for the vertical and horizontal passes, which could then operate sequentially or concurrently.

Figure 13:
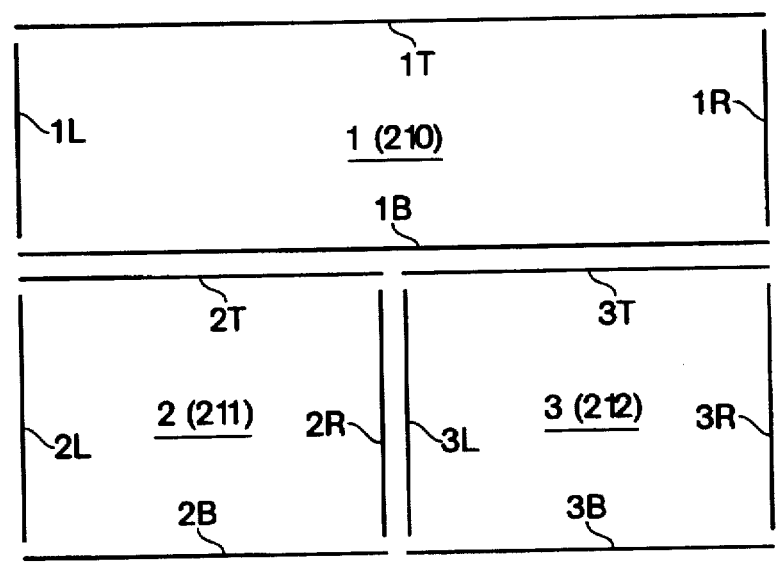
FIG. 13 is an expanded view of panes and pane edges in the configuration of FIG. 8.

So as to be able to use common terms for the construction of both vertical and horizontal partitions, the terms near edge and far edge are used to represent opposing edges of a pane. Near edge means the left edge of a pane for vertical edge analysis and the top edge for horizontal edge analysis. Far edge means the right edge when performing vertical edge analysis and the bottom edge when performing horizontal edge analysis. These terms are arbitrary and for convenience only. FIG. 13 illustrates the edges of the panes 210, 211, 212 used to form partitions. The panes 210, 211, 212 are respectively referenced as 1, 2, and 3, with corresponding edges referenced as r, t, b, for left, right, top and bottom edges. For the vertical pass, the left edges $1l$, $2l$, $3l$ are near edges, and the right edges $1r$, $2r$, $3r$ are far edges. For the horizontal pass, the top edges $1t$, $2t$, $3t$ are near edges, and the bottom edges $1b$, $2b$, $3b$ are far edges.

The creation of partitions involves determining which edges are to be used in forming a partition, so as to be members of the partitions. An edge is considered to be a member of a partition if the edge is aligned with the partition and its extent is contained by and fully included within the partition's extent. A pane itself is considered to be a member of a partition if one of its edges is a member of the partition.

Because border (exterior) partitions are situated at the tiler's borders, they are not between panes, and have member panes to one side only. Border partitions are therefore formed simply from the edges of panes which are situated at one of the tiler's borders or frame. Because of this, border partitions are not formed from combinations of both near and far edges, but instead are formed near edges exclusively or from far edges exclusively.

Interior partitions, on the other hand, are situated between panes, such that there are one or more member panes to each side of an interior partition. Stated differently, an interior partition is formed by a combination of at least one near edge and at least one far edge of different panes. The creation of interior partitions, then, involves finding a combination of near edges which is coextensive with a combination of far edges.

At step 502, a series of work arrays are created for use in the edge matching and partition construction process. As illustrated in FIG. 14A, these work arrays include arrays for near edges 540, far edges 541, matched edges 542 and partitions 543. At step 503, edge data structures representing the near and far edges of each of the panes are created and placed in the appropriate array. This is done by iterating through all shown panes in the tiler, identifying the near and far edges of each pane's exterior rectangle 347, and building corresponding edge data structures for each such edge.

Each of the near edge, far edge and matched edge work arrays, are maintained in sorted order. They are ordered first by the edge position or location (the x coordinate for vertical edges and the y coordinate for horizontal edges), and sub-ordered by the start of the edge's extent (the top for vertical edges and the left for horizontal edges). FIGS. 14A–14D illustrate the contents and operation of these work arrays in creating vertical partitions for the pane configuration of FIG. 8. The parenthetical information in FIGS. 14A–14D is to help distinguish types of edges and partitions.

The near and far edge arrays are first assembled and initialized at step 503, and as shown in FIG. 14A. Once this has been done, the edge matching process (steps 504 and 505) begins. Because there are no corresponding opposite edges or panes for exterior (border) edges, all exterior edges are considered automatically matched and are moved (step 504) out of the near and far edge arrays into the matched edge array in sorted order as shown in FIG. 14B. After step 504 is complete, only interior edges remain in the near and far edge arrays.

Matching of interior edges is the process of finding combinations of near edges which are aligned and have the same extent as a combination of far edges (step 505). In the example, the process is simple because the near edge 3*l* and the far edge 2*r* are aligned with each other and both have the same extent. These two edges are combined to form a single edge data structure 240 with the common location and extent of the two edges so matched. This matched edge data structure (designated 3*l*+2*r*) is then moved into the matched edge array as shown in FIG. 14C. At this point all near and far edges have been moved from the initial near and far edge arrays into the matched edge array.

As pane edges are maintained in alignment with either a tiler border or with one or more edges of other panes, the edge matching process will always find a combination of edges such that all edges will eventually be matched. Exterior edges, those aligned with the tiler's borders, are automatically matched with themselves. All interior edges, in some combination, will be able to be matched with one or more opposite edges. After completion of step 505, the matched edge array represents the smallest or atomic groupings of edges which can be managed and moved together while preserving non-overlapped tiling and rectangularity of aligned panes.

The next step in the partition construction process (step 506) is to build initial partitions from combinations of one or more matched edges as stored in the matched edge array at the completion of step 505. There are three basic types of partitions which are initially formed:

unitary whole partitions, which are formed from matched edges which are not extended by any other matched edges;

composite whole partitions, which are built from two or more matched edges which are aligned and extend each other, and are the largest combination of aligned edges which can be manipulated together; and segment partitions, which are segments of a composite whole partition and are formed from the individual matched edges which have been used to form composite whole partitions.

Matched edges represent the smallest groupings of pane edges which can be moved together. Partitions may be formed from either single matched edges, or from combinations of matched edges. For instance, the matched edges 1*l* and 2*l* can be combined to form the composite whole partition 1*l*+2*l*, so as to be moved together. Because these two matched edges can both also be moved individually, they can additionally be used to form the individual segment partitions 1*l* and 2*l*.

The process of constructing partitions from matched edges involves iterating through the matched edge array to identify which matched edges extend other matched edges. An edge, a matched edge or a partition is considered extended by another when the two are aligned (such that vertical entities have the same x coordinate and horizontal entities have the same y coordinate) and when the extent of one begins where the other ends.

Those matched edges, such as 3*l*+2*r*, which are not extended by others, will be used to form unitary whole partitions. Those matched edges, such as 1*l* and 2*l*, which are extended by others, can be joined to form composite whole partitions. Additionally, when matched edges are so joined or composited, they are individually used to form segment partitions. Thus, because matched edges 1*l* and 2*l* extend each other, the composite whole partition 1*l*+2*l* can be formed, as well as the two individual segment partitions 1*l* and 2*l*. These segment partitions are, in a sense, child partitions of a parent composite whole partition.

FIG. 14D shows the contents of the partition array 543 after construction of initial partitions from matched edges. In addition to the partitions 1*l*, 2*l* and 1*l*+2*l*, matched edge 3*l*+2*r*, which is not extended by any other matched edge, forms the unitary whole partition 3*l*+2*r* only. Because matched edges 1*r* and 3*r* extend each other, they can be used to form composite whole partition 1*r*+3*r* as well as the individual child segment partitions 1*r* and 3*r*.

As each partition is formed, it is placed in sorted order in the partition work array 543 such that whole and segment partitions are stored together. In one embodiment, the vertical and horizontal partition arrays may be maintained in an order which simplifies the partition lookup process. Partitions are first ordered by their position or location-the x coordinate for vertical partitions and the y coordinate for horizontal partitions. Within a group of partitions at the same location, the partitions are subordered by type, with multi-segment partitions first, segment partitions next and whole partitions last. A group of same-type partitions at a given location is further subordered by the start of the partitions' extent. Alternative orderings may also be used.

After completion of the vertical partition construction pass (step 500), steps 502–509 are repeated for the horizontal pass (step 510). FIGS. 15A–15D illustrate the contents of the work arrays 540–543 during the horizontal pass for the configuration of FIGS. 8 and 13. At step 503, the top and bottom pane edges are inserted into the near and far edge arrays, 540 and 541 respectively (FIG. 15A). The border edges are then moved from the near and far edge arrays to the matched edge array 542 at step 504 (FIG. 15B). At step 505, the remaining interior edges are matched and moved to the matched edge array 542 (FIG. 15C).

Unlike the vertical pass, however, as shown in FIG. 15C, there is no simple one-to-one matching of interior near and far edges. Instead, the combination of the two near edges 2*t* and 3*t*, which extend each other, are in combination coextensive with the far edge 1*b*. When a set of near edges is found to be coextensive with a set of far edges, the near and far edges, in combination, are considered to be matched. Because the combined extent of 2*t* and 3*t* is the same as the extent of 1*b*, the three edges together are matched (1*b*+2*t*+3*t*). A single edge data structure 240 is then formed with the common position and the entire extent of the three individual edges, and is placed in the matched edge array, as shown in FIG. 15C.

When a one-to-one matching of coextensive near and far edges is not found, as in this instance, extending edges must be successively combined until a set of one or more combined near edges is found to be coextensive with a set of one or more combined far edges. Once all near and far edges are combined to form matched edges, partition data structures can be constructed.

Figure 16A:
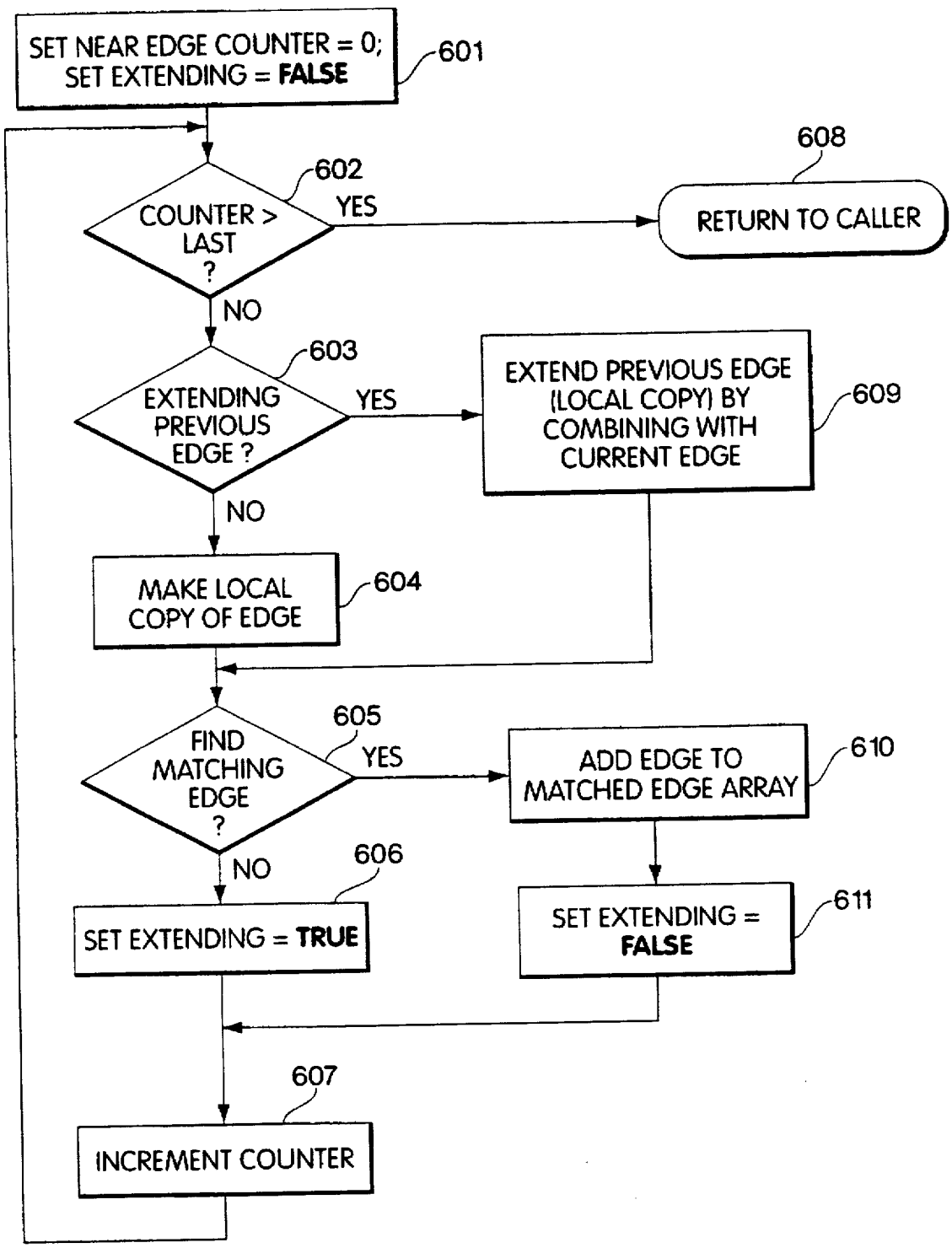
FIGS. 16A and 16B are block flow diagrams of the process for matching edges.
Figure 16B:
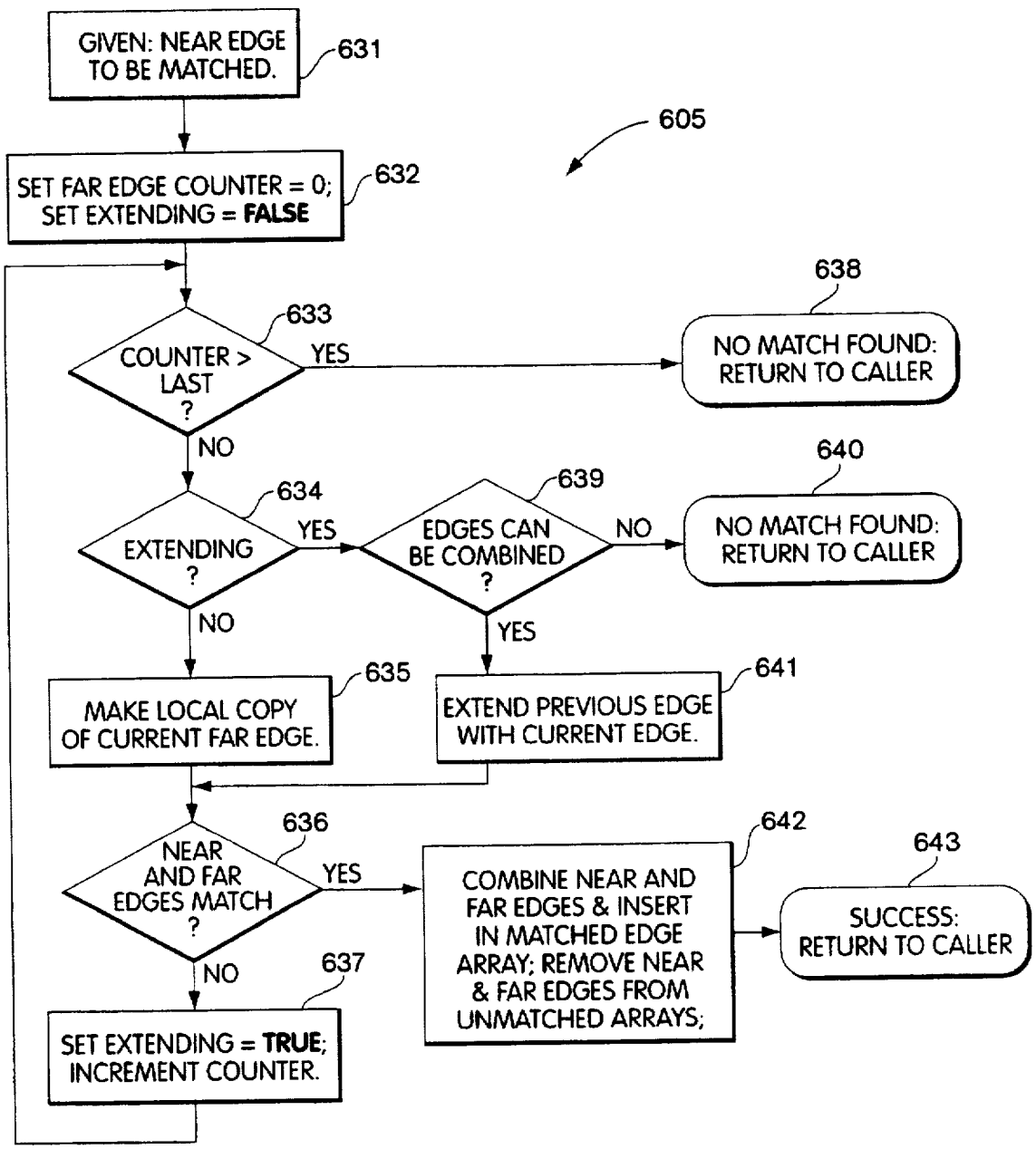

The process for the successive combination is illustrated in the block flow diagrams in FIGS. 16A and 16B. Data is initialized at step 601. At the first iteration (no extension in step 603), a local copy of the edge information is made at step 604, and then an attempt is made to find a match at step 605. Step 605 is further illustrated in FIG. 16B, discussed below. If a matching edge is not found, then the edge must be extended (step 606) and the process is repeated. For the second iteration (yes in step 603), the local copy of the previously considered edge is extended by the next successive edge (step 609), and then a match is again attempted (step 605). Because edges are ordered by location and subordered by extent, edges which extend each other will be found at successive locations in the edge arrays. When a match is found, the edges, as extended, are added to the matched edge array at step 610 (or alternatively, at step 642 of FIG. 16B). The process is repeated until all edges have been matched.

FIG. 16B illustrates the process of finding a combination of far edges to match a near edge or extended near edges. Given a near edge or group of extended near edges as an input parameter, the process looks for a single far edge or a group of extended far edges which are coextensive with the near edge parameter. As with the process illustrated in FIG. 16A, the edge matching process selects an edge by making a local copy (step 635) on the first iteration, i.e., not extending at step 634, or extending a current edge with the previous local copy of an edge (step 641). Prior to extending an edge, the system determines whether the edges extend each other and can be combined (step 639). Because edges which extend each other must be successive entries in the edge array, at step 639, if the two edges do not extend each other, then no match has been found and the process returns to the caller at step 605.

At step 636, the near edge parameter and the local copy of the far edge are compared. If the combination of near edges is coextensive with the combination of far edges, then they are combined to form a matched edge. This is done at step 642 (or alternatively at step 610 of FIG. 16A) by creating a new edge data structure with the common position and extent and inserting it in sorted order into the matched edge array. After creating the matched edge the function returns to the caller (step 643) and subsequent edges are considered. If the combination of edges does not match (step 637), then the far edge is extended, if possible, and a new comparison is made in the next iteration.

As shown in FIG. 15B, once the border edges are automatically matched and moved into the matched edge array, the interior edges 2t, 3t and 1b remain to be matched. First a local copy of near edge 2t would be made (step 604) and an attempt made to match it. In attempting to match edge 2t, a local copy of far edge 1b would be made at step 635. Since the edges do not match (step 636) and there are no more far edges (step 633), the process returns to step 606 to extend the near edge. Since there is another near edge (step 603), the local copy of the near edge is extended to include both 2t and 3t (step 609) and an attempt is made to match the extended near edge. A local copy of the first far edge is again made (step 635) and compared with the local copy of the extended near edge. In this case, the edges match, and are combined and moved into the matched array in sorted order.

As with the vertical pass, after all the edges have been matched, partitions are formed from each matched edge and combinations of matched edges as illustrated in FIG. 15D. In this case, unitary whole partition 1t will be formed; matched edge 1b+2t+3t, is not extended by any other matched edge and forms a single unitary whole partition only; and lastly, matched edges 2b and 3b extend each other and can be combined to form both the composite whole partition 2b+3b and the two individually manipulable segment partitions 2b and 3b. The horizontal partition construction pass has then considered six pane edges, formed four matched edges and five partitions, of which there are two unitary whole partitions (1t and 1b+2t+3t), one composite whole partition (2b+3b) and two segment partitions (2b and 3b).

Once the vertical and horizontal partition construction passes have been completed, cross partitions are constructed by examining the intersections of the vertical and horizontal partitions. When an intersection is found, a cross partition data structure is created in the cross partition array 331, with references 382, 383 to the particular intersecting vertical and horizontal partitions (step 520). A cross partition so constructed provides the user the ability to manipulate both the vertical and horizontal partitions simultaneously. In a preferred embodiment, only interior whole partitions are included in determining cross partitions, and exterior partitions and segment partitions are ignored. Of course, cross partitions could be used to permit simultaneous manipulation of any perpendicularly intersecting partitions. In the case of the layout of FIG. 8, only one intersection of whole interior partitions exists—the intersection the vertical partition 3l+2r and the horizontal partition 1b+2t+3t.

Once all partitions have been created, the tiler's previous partition arrays are discarded and replaced with the newly created arrays (step 530). Subsequent processing causes pane tenants to be repositioned (step 705), and new partitions to be displayed (step 706). Partition construction is invoked in many different circumstances, and only certain panes may need to be moved or redrawn for any particular situation. For instance, if partition 274 (FIG. 8) were to be moved, only panes 211 and 212 would be repositioned, and pane 210 would remain unchanged. Positioning of pane contents involves allocating space within the pane's exterior rectangle for partition display, the title bar (if shown) and the pane's tenant window. A pane's exterior rectangle frames all of the component areas of the pane and each edge of the exterior rectangle may be directly aligned with other panes' edges or the tiler's border.

Figure 17:
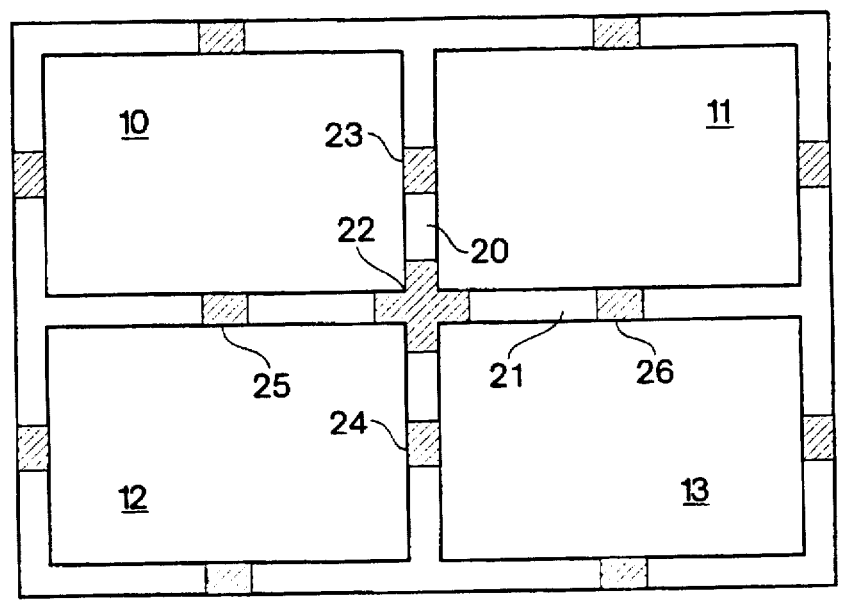
FIG. 17 is another embodiment of the configuration of FIG. 1.

While a partition user interface device may appear to be between individual panes, in one embodiment, they are displayed within the exterior rectangles of the panes on either side of a partition. As shown in FIG. 10, partitions may be depicted in the space between the exterior rectangle 410 and the interior rectangle 420. Thus, a partition's edge definition 360 corresponds to a line of a given location and extent, and the partition's pickup or display rectangle 361 define a display area which may overhang abutting panes. Additionally, because segment, whole and cross partitions may be co-located, they will share the same display area, though they are able to be distinctly displayed according to one aspect of the invention. Such distinct display is shown in FIG. 17 and discussed below.

The process for repositioning pane contents is straightforward. The partition display areas are first subtracted from the exterior rectangle. This is based on user-configurable parameters for partition display thickness. By setting partition thickness to 0, partitions can be hidden. Because interior partitions may straddle two or more panes, half of the partition thickness can be allotted from the pane(s) on one side of the partition and half can be allotted from the pane(s) on the other side. If the title bar is shown separately from the tenant window, an area is allotted at the top, and the remaining pane space is reserved for the tenant window, that is, the application window or region associated with the pane. The title bar may alternatively be not shown, be shown elsewhere, or be included as part of the tenant application window. Once the pane space has been divided, the tenant window is repositioned, and the title bar and partitions are redisplayed. In a preferred embodiment, whole partitions are drawn first with a user-configurable color and style. Segment and cross partitions which will overlap whole partitions are then drawn on top of portions of the whole partitions.

Discrete Access and Display of Co-located Partitions

An important aspect of the interface is its ability to distinctly display multiple co-located partitions so as to allow them to be distinguished from each other, and so that a user may discriminate among them for individual selection. FIG. 17 depicts the configuration of FIG. 1, but now with the details of segment, cross and whole partition pickup regions shown. A pickup region is a hotspot or area which is individually responsive to a mouse or other pointing device partition selection. Such pickup regions may be specially colored or have other distinctive display features, and may also be indicated by other means, such as by modifying the pointing device's cursor when it is located over the pickup regions. The mouse sensitivity area and the display area of a pickup region are usually the same. However, in situations in which partitions are not visible, or have reduced thickness, so as to make ordinary pointing device selection difficult, the sensitivity region may extend beyond the display area. In this way, partitions may be more easily accessed without unnecessarily occupying display space.

As with FIG. 1, FIG. 17 illustrates four panes 10–13 separated by two composite whole partitions 20, 21. Also shown are shaded segment and cross partition pickup regions, which correspond to the like numbered segment and cross partitions of FIG. 1. Segment partitions 23, 24, which are together coextensive with 20, are displayed on top of 20, but so as to be individually distinguished from 20, and so as to be individually selectable. Similarly, the pickup regions corresponding to cross partition 22 and segment partitions 25, 26 are distinctly displayed.

Pickup regions represent and provide selection of entire partitions. Thus, when the pickup region 23 is selected by the pointer device, the entire segment partition coextensive with the right edge of pane 11 is selected. When the pickup region 24 is selected, the entire segment partition coextensive with the right edge of pane 12 is selected. Similarly, while cross partition 22 is co-located with the whole partitions 20, 21, the cross partition's pickup region allows it to be individually accessed, selected and manipulated. When selected, the entire cross partition, including both 20 and 21 is selected.

Because manipulation of whole partitions tends to be done more frequently than manipulation of segment partitions, a generally larger pickup region is reserved for whole partitions. This larger pickup region includes the remaining unshaded areas, that region of the partition exclusive of segment or cross partition pickup regions. In order to select the whole partition 20 then, the pointing device is positioned over one of the unshaded areas of that partition, that is, any portion of whole partition 20 excluding the segment and cross partition pickup regions 20, 21 and 22.

A chief advantage of this ability to provide individual display of and access to multiple co-located partitions is that it allows the interface to manage multiple kinds of partitions and present them to the user for alternative kinds of manipulation.

Flanking Segment Partitions and Multi-Segment Partitions

The discussion of the process of partition construction has so far covered the initial creation of segment, whole and cross partitions. Two other types of partitions are also created in later steps: flanking segment partitions (at step 507) and multi-segment partitions (at step 508). The process is illustrated with respect to the more complex arrangement of panes shown in FIG. 18.

A flanking segment partition is a segment partition which has the same location and extent as a corresponding unitary whole partition. The manipulation of a flanking segment partition, however, differs from that of the unitary whole partition when moved beyond an adjacent partition. In one embodiment, when a unitary whole partition is moved beyond a next partition, it will cause consequent movement of the next whole partition, so as to accommodate movement of the first partition. When a segment or flanking segment partition is instead moved, other segment partitions will be selected for consequent movement. Such consequent partition movement is discussed more fully in a later section.

Figure 18:
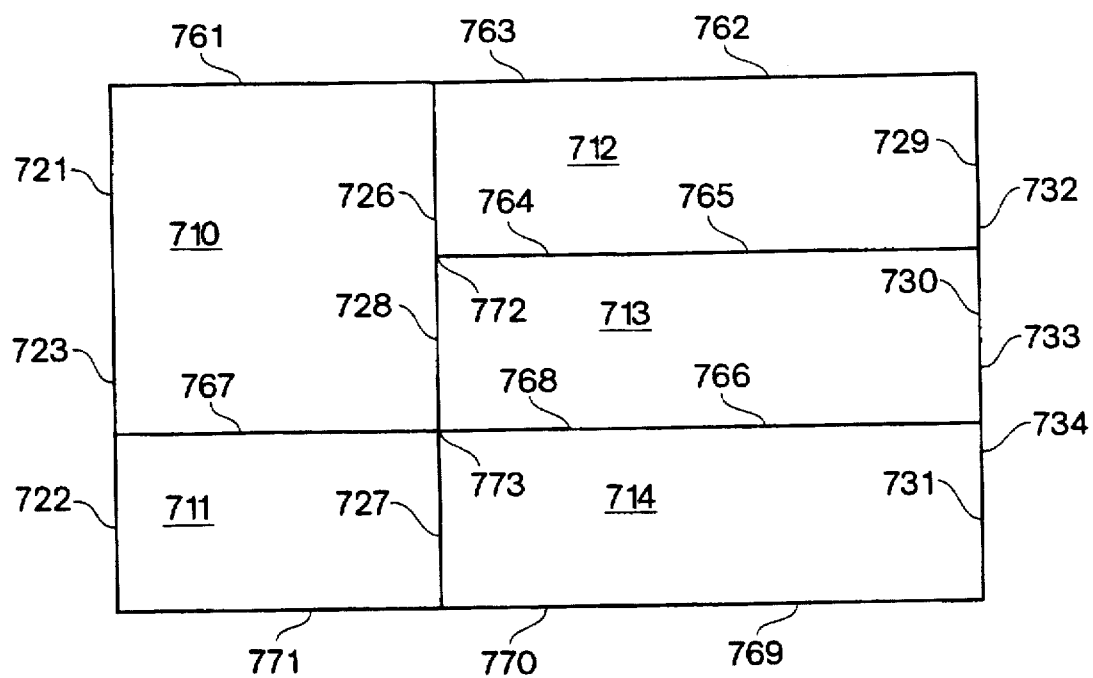
FIG. 18 illustrates a tiler configuration according to the present invention.

For example, in FIG. 18, a unitary whole partition 764 is coextensive with a flanking segment partition 765. When the unitary whole partition 764 is moved downward past the next partition, the composite whole partition 768, including segment partitions 766 and 767, will be consequently moved as pane 713 is collapsed to a minimum height. Movement of partition 768, in turn, results in the additional resizing and repositioning of panes 710 and 711 as well as 712–714, and thus causes modification to all five panes of the configuration. When, instead, flanking segment partition 765 is moved downward past the next partition and to similarly cause collapsing of pane 713, only segment partition 766 will be consequently moved, and both panes 710, 711 will be unaffected.

Flanking segment partitions have the same behavior, functionality and appearance as other segment partitions, and in a sense, are artificial segment partitions, created primarily to provide this sort of partition manipulation. They are formed by a different process than that described earlier for other segment partitions. In one embodiment, this process involves examining candidate unitary whole partitions. For each such candidate, a search is done to find out whether parallel neighbor segment partitions exist—these would be the segment partitions which the flanking segment partitions would cause to move. Such neighbor segment partitions must be interior partitions, must be a nearest neighbor to the candidate partition, and must have an extent which fully includes the extent of the candidate partition. If such a neighboring parallel segment partition is found, a flanking segment partition is formed. It is given the same location and extent as the candidate unitary whole partition and placed in the appropriate partition array. If no such neighboring segment partitions are found, no flanking segment partition is added.

A multi-segment partition is a joining of two or more segment partitions to form a separately managed and manipulable partition. Multi-segment partitions behave and are manipulated like single segment partitions and provide simultaneous movement and manipulation of two or more segment partitions. The purpose of multi-segment partitions is to provide additional and alternative manipulation of the tiled layout. Because of this, in a preferred embodiment, multi-segment partitions are not built if there is a coextensive whole partition—such a whole partition would provide the same manipulation capabilities, and there would be no utility in creating the additional multi-segment partition. Instead, the extent of multi-segment partitions is always less than the extent of a co-located composite whole partition. In one embodiment, multi-segment partitions may be created for combinations of two border segment partitions only. However, multi-segment partitions could be created for any number or type of segments.

Multi-segment partitions are constructed at step 508 after formation of the initial whole and segment partitions, and after formation of flanking segment partitions. They are built by iterating through the partition work array 543, and for each segment partition, looking for another segment partition which extends the first segment partition. Once found, the two segment partitions are composite to form a candidate multi-segment partition. A search of the partition array is then done to determine whether a coextensive whole partition exists. If no such coextensive whole partition is found, the candidate multi-segment partition is added to the partition array. Otherwise the candidate multi-segment partition is discarded, as it would duplicate the operation of the whole partition.

As an example, in FIG. 18, segments 729, 730 and 731 are on the right border of the tiler and are coextensive with the right edges of panes 712, 713 and 714, respectively. Whole partition 733 is a combination of all three of these segments. Segments 729 and 730 can be combined to form a multi-segment partition 732 which is not coextensive with the whole partition 733. Similarly, segments 730 and 731 can be combined to form a multi-segment partition 734 also not coextensive with 733.

FIG. 19A illustrates the contents of the vertical partition array for the configuration of FIG. 18; FIG. 19B illustrates the contents of the horizontal partition array for the configuration of FIG. 18; and FIG. 19C illustrates the contents of the cross partition array for the configuration of FIG. 18.

Pane and Partition Movement

Once all partitions have been created and displayed and the pane tenants have been positioned, the user is able to manipulate the various partitions to effect new layouts. Partition movement may be accomplished using a pointing device such as a mouse. Alternatively, other methods, including keyboard, programmatic and indirect methods, could be used for selecting partitions to be moved and for indicating the direction and extent of movement.

When the user positions the mouse over a partition, an appropriate cursor may be displayed indicating the partition type (segment, whole, multi-segment or cross partition) and the partition direction (vertical or horizontal). A particular partition can be selected for movement by selecting it with the pointing device, such as by pressing the left mouse button. Because various types of partitions have overlapping extents, but need to be individually selected, managed and manipulated, each type of partition may be assigned and displayed as a pickup region (e.g., 22–26 of FIG. 17) to allow the user to uniquely select a particular partition.

As the mouse is moved, the cross, vertical and horizontal partition arrays are searched to determine which partition's pickup region, if any, is located at the current mouse position. If the search results in a partition being found at the current mouse position, an appropriate cursor, corresponding to the located partition, may be shown. When the user presses the mouse button to select a partition, the same lookup process is used to identify the selected partition.

In one embodiment, when a search for a partition at a given location is performed, the cross partition array 331 is searched first, effectively giving cross partitions precedence over all other partitions. If no cross partition is found at the location, the vertical partition array 327 is next searched, followed by a search of the horizontal partition array 329. Because of the ordering which places multi-segment and segment partitions ahead of whole partitions in the vertical and horizontal partition arrays, multi-segment and segment partitions are selected ahead of and are given precedence over co-located whole partitions. In effect, the segment partitions' smaller pickup regions are excluded from the larger pickup region of co-located whole partitions. A whole partition's pickup region then, can be maintained as a single rectangle, 361, with excluded segment partition pickup regions given precedence in the lookup process. Thus, when the mouse is situated over segment partition 23's pickup region, the associated segment partition is selected ahead of the co-located pickup region of whole partition 20.

In a preferred embodiment, the user can perform partition movement by positioning the mouse over one of the partition pickup regions, selecting the partition with the left mouse button, dragging the partition to new tentative locations with the mouse button held down, and finally, repositioning the partition at the desired location by releasing the mouse button. While being dragged, none of the partition locations change, but the new partition location is drawn on the tiler as a tracking partition to give the user feedback. Such tracking partitions are not true partitions in the sense of separating panes, and no corresponding partition data structures are allocated. Instead, they are just graphic representations of where the partition being moved would be placed were the mouse to be released. Rather than allocating and creating partition data structures 230, tracking partition display can be derived from existing partitions by reference to the movement field 362. This movement amount represents a partition's current location relative to its original location at the beginning of the partition movement operation.

Figure 20A:
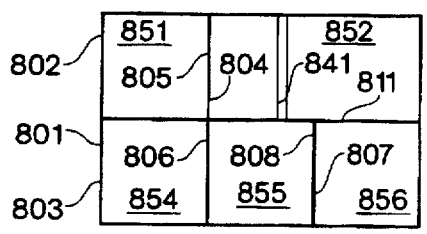
FIGS. 20A–20F illustrate partition movement.

FIG. 20A illustrates a configuration with movement of a tracking partition. Segment partitions 805 and 806 are coextensive with the right edges of panes 851 and 854 respectively, and together are coextensive with composite whole partition 804. Segment partition 805 has been selected and moved to the right, resulting in the display of the tracking partition 841. Once the partition is placed, the configuration is redrawn as illustrated in FIG. 20B.

With the release of the mouse button, the concluding steps of partition movement are performed. Pane edges which were aligned with moved partitions are moved to their new locations. This is done by applying the amount of movement stored in the partitions' movement field 362 to the panes' exterior rectangles 347, thereby resizing and relocating the panes. Once all panes have been adjusted (step 702), tiler size and scrolling adjustments are made (step 703), new partition arrays are constructed based on the new pane locations (step 704), and the remaining steps of the layout manipulation sequence are performed (705–707).

As a partition is dragged to new tentative locations, it causes tentative resizing of panes on either side of the partition. The tentative repositioning of the partition is stored in the movement field 362, but is not applied to panes or partitions until the user has completed the movement operation, for instance, by releasing the mouse button. When this occurs, the mount of movement stored in the movement field 362 is applied to the edges of exterior rectangles for panes abutting the partition. In the example of FIG. 20A, when partition 805 is moved to the right, the right edge of pane 851 and the left edge of pane 852 will be shifted by the movement amount. This causes pane 851 to increase in size, and pane 852 to decrease. Once the panes have been repositioned, new partition arrays are constructed and replace the old partition arrays, according to the process described above.

Figure 20D:
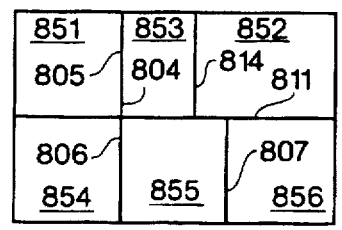
Figure 20B:
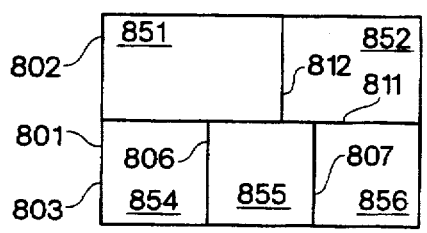

After building the new partition arrays, the tiler is redrawn and redisplayed with the new configuration, as illustrated in FIG. 20B. Partition 805 has been moved to create new partition 812. While the configurations of FIGS. 20A and 20B are fairly similar in appearance, they will be internally represented by substantially different partitions. For example, the composite whole partition 804, formed from partitions 805 and 806, does not exist in FIG. 20B since the partitions 812, 806 are not aligned. Where 805 and 806 were segment partitions in FIG. 20A, 812 and 806 are unitary whole partitions in FIG. 20B. The interior horizontal partitions have changed with the replacement of a composite whole and two segment partitions by a unitary whole partition. Additional cross partitions have been created and a flanking segment partition has been removed.

In situations where partition movement exceeds the width or height of an abutting pane, other partitions may be also caused to move. That is, when a partition on one side of a pane is moved so as to reduce the pane's width or height below a configurable minimum, the partition on the pane's opposite side may be automatically moved. The pane is collapsed, and may be entirely repositioned as partitions on opposite sides are moved. This collapsing of panes and automatic consequent movement of opposite partitions occurs successively-as panes are collapsed by partition movement and cause opposite partitions to move, continued movement of these opposite partitions may cause other panes to collapse and other opposite partitions to be moved, and so on.

Figure 20E:
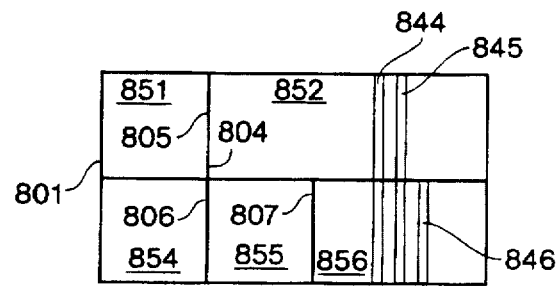
Figure 20C:
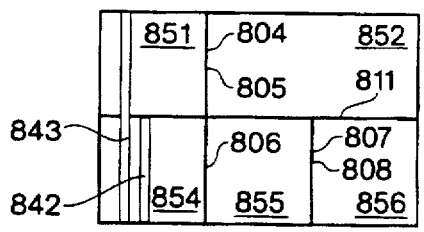

A simple example of this is shown in FIG. 20C which illustrates movement of unitary whole partition 807 to the left past composite whole partition 804, causing its consequent movement. As partition 807 is tentatively moved to the left, its movement is indicated by tracking partition 842, and causes tentative resizing of panes 855 and 856 on either side of the partition. Once tracking partition 842 is moved to the left, closer to partition 804 than the minimum width of 855, partition 804 is consequently moved left, so as to maintain the minimum width of 855. Partition 804's movement is indicated by tracking partition 843. The panes are not resized nor are new partitions created until movement is completed, that is, when the mouse button is released. If tracking partition 842 were moved back to the right prior to releasing the mouse button, tracking partition 843 would also move to the right until it arrived at its original position. FIG. 20C illustrates movement of whole partition 807, which causes the whole partition 804 to be moved. Alternatively, a flanking segment partition 808, located at the same position as partition 807, could be selected, which would have caused only segment partition 806 to be moved without affecting partition 804.

Consequent partition movement applies to any number of successive partitions, for all partitions of a tiler. As a partition is tentatively moved, the amount of movement is stored in the partition's movement field 362, and the resultant width and height of abutting panes is calculated. These calculated pane dimensions are then tested, and if they are reduced below a minimum, consequent movement of partitions on the opposite side of the pane is triggered. Movement of these consequently moved partitions can be performed recursively or successively, and can in turn trigger other consequent partition movement. Minimum pane dimensions can be determined on a per-pane, per-tiler, global, or other basis.

A pane can be bounded on any side by co-located segment and whole partitions. Thus, when consequent partition movement occurs, the interface can select among these partitions to determine which is to be moved. When partition movement reduces a pane to a minimum dimension, a search can be done to find partitions aligned with the pane's opposite side. As the search can result in finding co-located segment and whole partitions, preference can be given to one type of partition over another.

This can be done based on the type of the movement-initiating partition. When a segment partition initiates movement, other segment partitions can be given precedence over whole partitions for consequent partition movement. When the movement-initiating partition is a whole partition, the opposite may occur, and segment partitions can be ignored.

To return to the example of FIG. 20C, partition 807 is a unitary whole partition. When it is selected for movement and moved sufficiently to the left, it causes pane 855 to be collapsed to a minimum width and the consequent movement of a partition on the collapsed pane's opposite side. Because a whole partition initiated the movement, the whole partition 804, which includes both segments 805 and 806 is selected instead of segment partition 806 only. The tracking partitions 842 and 843 indicate the result of such movement.

Alternatively, a flanking segment partition 808, coextensive with 807 can be selected to initiate partition movement. When pane 855 is then collapsed to a minimum width, the segment partition 806 is given precedence over the whole partition 804 because a segment partition initiated the movement. In this case, segment partition 806 is moved separately from the whole partition, and in effect, is detached from the whole partition. The end result of this is that in this latter case, neither pane 851 nor pane 852 are modified, whereas in the former case, both were resized.

Any movement-initiating segment partition, and not just flanking segment partitions, may be used to effect such movement. Thus, if the exterior composite whole partition 801 (co-located with both segment partitions 802 and 803) were to be moved to the right, it would cause movement of whole partition 804. Were segment partition 803 moved to the right it would cause consequent movement of segment partition 806. Additionally, while the examples show consequent movement of segment partitions having the same extent as the movement-initiating partitions, this is not required.

Cross partitions effectively operate to move both a vertical partition and horizontal partition referenced by indices 382, 383 into the tiler's vertical and horizontal arrays 327, 329. Cross partition movement has the same behavior and effect as the simultaneous movement of the horizontal and vertical partitions referenced by the cross partition. As an example, if the cross partition referencing partitions 804 and 811 in FIG. 20A were to be moved down and to the right, it would have the same effect as moving the composite whole partition 804 right and moving 811 down, at the same time. As with movement of individual partitions, successive partitions in both the horizontal and vertical directions will also be consequently moved to maintain minimum pane widths and heights.

Partitions may also be moved beyond the borders of the tiler. This may have the effect of increasing the internal extent of the tiler, but not its display width or height. If a tiler's extent is increased beyond its display dimensions, a vertical or horizontal scroll bar may be used with the tiler, to permit scrolling of the tiler to access to all portions of the panes.

Finally, an additional aspect of the invention implements auto-alignment or snap-in-place partitions. When a partition is moved into substantial alignment with another partition, the partition can be adjusted to be actually aligned, prior to resizing the panes and recreating the partitions. Auto-alignment calculations can be implemented in various ways. The position of a moved partition can be compared with existing partitions to determine potential alignment and to adjust the moved partition as necessary. Alternatively, user-configured x and y alignment parameters can be used to define a set of valid positions and effect grid-alignment of partitions.

When the user releases the mouse button at the end of the partition movement process, the appropriate alignment calculation is performed and applied to the moved partition. This results in the partition being moved to the calculated coordinate and to appear to snap into place. Use of this feature allows partitions to be easily brought into alignment with other partitions so as to be joined into whole partitions. Because the alignment parameters are configurable, this feature may be effectively disabled or tuned to the specific user requirements.

Alternative Pane Manipulation

The preceding discussion is chiefly concerned with partition movement and manipulation. It should be kept in mind, though, that the end result of partition movement is a modified layout of panes and their contents. While direct manipulation of partition user interface devices provides a convenient way to modify pane layouts, there are various other ways by which pane layouts may be changed. Alternative methods may involve entirely different user interface devices.

Both partition and alternative user interface devices may be used to operate internal mechanisms of the sort described here to effect alterations of pane layouts. These mechanisms may involve internal representations similar to the partition data structure 230.

The distinction between partitions as user interface devices and as data structures is meaningful. As user interface devices, partitions may be visually depicted in a number of ways. Co-located partitions (e.g., segments and composite wholes) may be distinctly displayed so as to be distinguished from each other. Further, as user interface devices, partitions may be selectable by use of a mouse or other means, and co-located partitions may be discriminated among so as to be discretely selectable.

Such display and selection properties are characteristics of a user interface device. In a preferred embodiment, implementation of partition user interface devices is based on a partition data structure 230. In alternate embodiments, however, such partition user interface devices may be based on other internal representations. Conversely, pane layout alteration mechanisms of the sort described here may be implemented in the absence of such partition user interface devices.

Figure 21A:
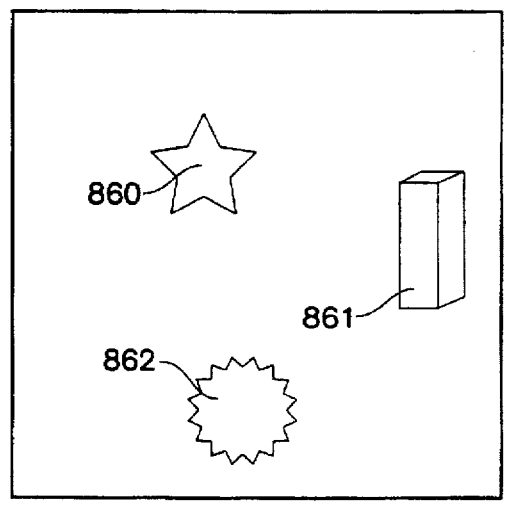
FIGS. 21A–21C illustrate visible and non-visible panes in a tiler configuration.
Figure 21B:
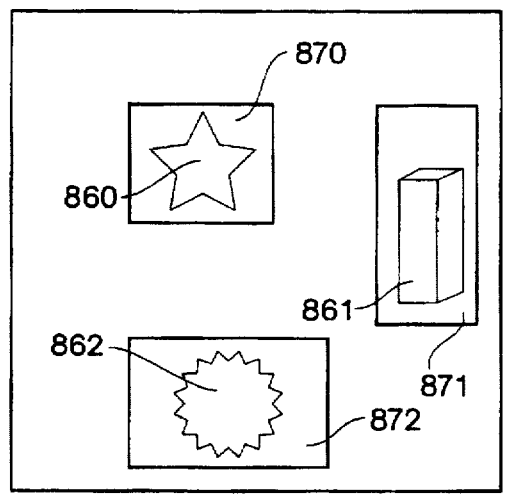
Figure 21C:
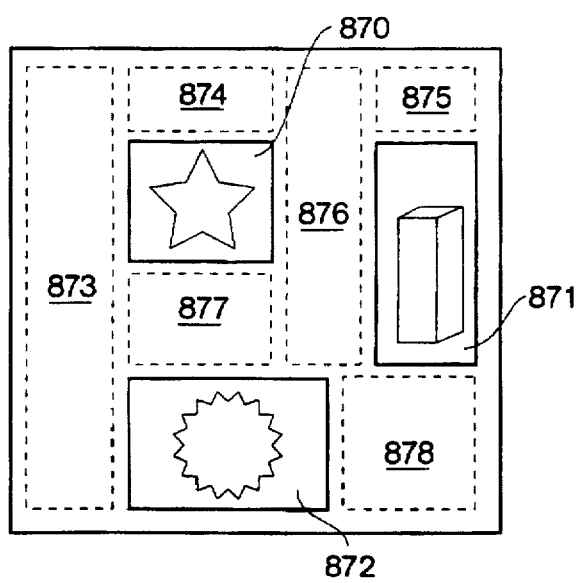

For instance, FIGS. 21A–21C illustrate an example application which appears to contain no panes or partitions at all. In FIG. 21A, neither partitions nor untenanted panes are shown, and tenanted panes are allowed to blend with the tiler's background. Because of this, the application, as shown in FIG. 21A, appears to contain only three graphic objects 860, 861 and 862, apparently freely positioned in a containing window.

FIG. 21B shows the internal workings of the application of FIG. 21A, in which the same three objects 860, 861, 862 are actually tenant application objects of panes 870, 871, 872. FIG. 21B may also represent an application in which tenanted panes 870–872 are visible. In FIG. 21C, the panes 870–872 are shown to be situated among a set of non-visible untenanted panes 873, 874, 875, 876, 877, 878 which serve as buffer areas.

Though the panes and partitions of the application of FIG. 21A are not readily apparent, the application objects 860, 861, 862, may be moved according to aspects and features of the present invention. The pane layout, moreover, may be manipulated without resort to partition user interface devices. Thus, in FIG. 21B, the panes 870–872 may be directly selected. Alternatively, in FIG. 21A, the same panes may be indirectly selected by selection of the tenant application objects 860–862. In either case, once the panes are selected, the pane layout can be altered by direct movement of the panes. Such movement may rely on layout alteration mechanisms described previously and on additional partition management methods discussed below.

As described so far, consequent partition movement has only been concerned with maintaining minimum pane dimensions. Certain applications, however, may require that panes not exceed a maximum dimension. This can be accomplished by other consequent partition movement methods. In particular, where a minimum pane size may be a threshold for causing consequent partition movement ahead of the direction of movement, in an opposite way, a maximum pane size may be a threshold for activation of trailing partitions, behind the direction of movement.

Ordinary partition movement may cause a pane to be expanded by moving a forward partition and leaving the pane's opposite rear edge anchored. The pane is thereby increased in width or height as the distance between the edges grows. As continued movement of the forward edge increases the pane's size to a maximum, the rear edge may be consequently moved, so as to maintain the pane's maximum dimension.

Such consequent movement may be applied to the rear edge in various ways. The edge may be moved with an aligned segment or whole partition, termed a trailing partition. If a trailing partition is a border partition, continued movement may be disabled, or may cause new panes to be automatically created as is caused by movement of other border partitions. Such automatically created panes are typically untenanted panes, such as 873–878 of FIG. 21C, and may be configured to be not be visible. Alternatively, the edge may be separately repositioned, apart from other partition movement, so as to cause either a new pane or empty region to be created behind it, without causing movement of trailing partitions.

As with other consequent movement, trailing partitions may successively affect other panes by expanding them to a maximum size and causing other trailing partition movement. Trailing partition movement may also be used in other circumstances, such as for dragging outer or scrolled-off panes into the display area as discussed later.

Maximum pane dimensions may also be used to assign a fixed or static size to a pane, by giving them the same minimum and maximum dimensions. In this way, a pane's width or height will neither exceed nor fall below a given size. These values can be stored in fields 351–354, or in various other ways, including on a per-tiler basis, in global variables, or obtained on an as-needed basis from application callbacks. Movement of a statically sized pane in any direction causes similar movement of both forward and rear partitions, as minimum and maximum dimensions are maintained. Panes may also be given a temporary fixed size which can be stored in the temporary sizing fields 355–358. Temporary fixed pane movement may be used when a pane, rather than a partition, is directly selected and moved.

In the configuration of FIGS. 21A and 21B, for instance, pane 871 may be selected for direct movement by various means, including selection of the tenant object 861. Because no single partition has been selected, all edges of the pane are moved together. This can be done by assigning the pane's current width and height as temporary minimum and maximum dimensions. Then, by joint movement of any bounding vertical and any bounding horizontal partition (as internal data structures, rather than as user interface devices), the other edges will be consequently moved either ahead of the direction of movement or behind. Simultaneous movement of bounding horizontal and vertical partitions in this manner, is, in effect, little different than cross partition movement, and may be similarly implemented.

An additional feature permits sets of panes to be selected for joint static-sized movement. For instance, in FIG. 21A, the tenant objects 860–862 may be selected together for joint movement, resulting in simultaneous movement of the containing panes 870–872. These panes can be jointly moved using various methods. One such method is to determine a bounding rectangle for all selected panes and then give all panes inside the bounding rectangle temporary static sizes. In this case, a bounding rectangle would include not only panes 870–872, but also the non-visible panes 876–878, all of which would be given temporary fixed dimensions.

Movement of the set of panes can then be accomplished by movement of a horizontal and a vertical partition data structure bordering any of the panes, in a way similar to the method for single pane direct movement. This can be done by virtue of the fact that all the panes in the set are temporarily locked in a fixed relationship, and any movement of one will affect the others in the set. Alternative group movement methods can also be used.

It is possible, using these methods, to implement tilers in which all but untenanted panes are static-sized (if all panes are static-sized, movement would be frozen). In such a configuration, untenanted panes are the only panes which are resizable and in effect may provide flexible buffer regions around the other fixed-sized panes. Such untenanted buffer panes may be automatically created by movement of trailing border partitions and by other means. FIG. 21C illustrates a possible configuration for an implementation of this sort.

In such an application, though, direct movement of static-sized panes may result in the automatic creation of many untenanted buffer panes. Automatic pane deletion, which is generally used only for untenanted panes, can provide a way to remove extra panes. Automatic pane deletion can be implemented by giving certain panes (e.g., automatically created untenanted panes) a minimum width and minimum height of zero. When these panes are then reduced to a zero width or height by pane and partition movement, they can be automatically deleted. By using this feature, applications such as that of FIGS. 21A–21C, may automatically create untenanted panes by movement of trailing border partitions, and automatically eliminate those panes as they are collapsed during partition and pane movement.

Pane Creation

New panes can be created and added to the tiler in a number of different situations including: when initializing and first creating a tiler with a pre-defined arrangement; when restoring or reapplying a particular pane configuration; when redisplaying a hidden pane; when incorporating an external window into a tiler; in response to an application-specific action; in response to a direct user request; and in other situations.

A pane is added to the tiler within the processing of the pane layout modification cycle as shown in FIG. 11. At steps 700 and 701, the tiler layout is altered and a new pane is created by allocating a pane data structure 215 and inserting it in the tiler's pane array 333. Alternatively, when redisplaying a hidden pane, allocation of a new pane data structure is not performed and instead a flag 344 is set indicating that the pane is now shown. At step 702, the function handling the pane creation instantiates the new pane's location (as stored in the exterior rectangle 347) and modifies the locations of existing panes to accommodate the newly added pane within the tiler. The rest of the cycle, steps 703–707, occurs as described earlier.

In one embodiment, partition manipulation can provide a direct means for the user to easily create new panes at run time and in an ad hoc fashion. Selection of an exterior partition with any mouse button or selection of an interior partition with the right mouse button causes partition movement to be done in pane creation mode. Other means for entering into pane creation mode may also be used, such as holding down a special key, selecting menu options or others. Once this mode is entered into, subsequent partition movement causes a new pane rectangle to be outlined for placement of a new pane. When the mouse button is released, a new pane is created and located in the rectangle described on one side by the movement-initiating partition and on the other side by the tracking partition. The perpendicular dimension of the new pane rectangle is defined by the extent of the movement-initiating partition.

Any exterior or interior partition can be used to outline a new pane rectangle and create a pane, whether a whole, segment or multi-segment partition. In one embodiment, cross partitions would not be used for pane creation purposes though they can serve as well as other partitions to delineate new pane rectangles for creation and placement of new panes within the tiler.

Using FIG. 20A as an example, selection of the segment partition 805 with the right mouse button automatically causes pane creation mode to be entered. Partition movement occurs in a similar way to that described earlier. As the mouse is moved to the right, a tracking partition 841 is used to indicate a new tentative position. As the tracking partition is moved, a tentative new pane rectangle is described, and may additionally be displayed if so desired and configured by the user. In this example, the new pane rectangle is bounded on the left by the movement-initiating partition 805, and is bounded on the right by the tracking partition 841. The vertical extent of the new pane rectangle is equivalent to the extent of 805, that is, bounded on the top by the tiler's top border and bounded on the bottom by the horizontal whole partition 811.

Unlike partition movement in simple movement mode (non-pane creation mode), when the mouse button is released, the movement-initiating partition is not relocated. Instead, a new pane is created and instantiated with the tentative rectangle described by the partition movement. Additional attributes of the pane, such as flags, interior rectangle dimensions, and title bar dimensions, will initially be set to default values when created.

Once the new pane is created and positioned, other panes are adjusted to accommodate the newly created pane. This can be done by reducing the width or height of the panes which neighbor the tracking partition in the direction of movement. Additionally, consequent movement of other partitions may also be applied to panes as in simple movement. In this case, as shown in FIG. 20D, pane 852 is reduced in width by the amount of movement, a new pane 853 is created, and all other panes remain unaltered. With creation of new panes, existing panes can be displaced from their relative positions in the tiler, and no longer be situated on the tiler borders. Because of this, existing panes may also require modification of their border flags and other attributes. As with other layout modifications, pane creation takes place within the layout modification cycle of FIG. 11, and after creation and repositioning of panes (step 702), the remaining steps (703–707) are performed.

Partition movement in pane creation mode is not restricted in any way, and partitions and panes are equivalently manipulable in both pane creation and simple movement modes. In particular, consequent partition movement may occur in which panes may be automatically collapsed to their minimum width or height, and their opposite partition may be automatically shifted. As with simple movement mode, automatic pane collapsing and shifting occurs successively.

FIG. 20E, which is based on the layout of FIG. 20A, illustrates pane collapsing and consequent movement in pane creation mode. The figure depicts movement of the border composite whole partition 801 to the right, past both partitions 804 and 807. Because the tentative movement of partition 801 would cause the resizing of panes 851, 854 and 855 to widths below minimum, the opposite partitions, 804 and 807 are also tentatively moved. The resulting tracking partitions 844, 845, 846 originate from and correspond respectively to the partitions 801, 804, 807, and indicate their tentative positions.

Because partition 801 is an exterior partition, its movement is automatically performed in pane creation mode. During movement, the rectangle defined by the area between the movement-initiating partition 801 and the corresponding tracking partition 844 describes the tentative new pane rectangle. This tentative rectangle may also be displayed in reverse video, outlined as a rectangle, or displayed in other appropriate ways.

Figure 20F:
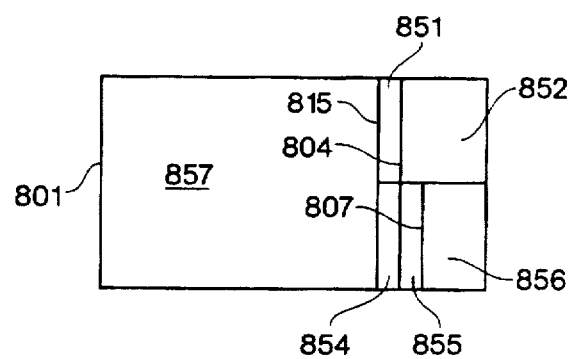

When the mouse button is finally released, a new pane layout is effected, as shown in FIG. 20F. The configuration includes a new pane 857 located in the tentative pane rectangle between partition 801 and the newly added unitary whole partition 815 which corresponds to the final position of tracking partition 844. Panes 851, 854 and 855 have been collapsed to their minimum widths and shifted right to the new locations indicated. The left edges of panes 852 and 856 have been shifted right, also reducing the width of those panes, though not to a minimum.

Additional partitions may also be created for special purposes. For instance, in FIG. 8, the top edge of pane 211 is not coextensive with an individual partition (rather, the top edges of 211 and 212 are together coextensive with partition 202). In such a case, an auxiliary segment partition can be created to facilitate creation of additional panes. Such an auxiliary segment partition would be coextensive with the top edge of pane 211, but movement of this partition ordinarily would be disabled except when in pane creation mode. When enabled for creation of a new pane, movement of the partition into the space of pane 211 causes a new pane rectangle to be described with a horizontal extent equivalent to that of the top edge of 211. Movement in the opposite direction, into the space of pane 210, causes partition 202 to be used to describe a new pane rectangle.

There are many other alternative methods for effecting creation of new panes. New panes can be created programmatically based on application-specific or user-configured parameters. New panes may be created based on particular pre-defined layouts or based on grid definitions consisting of particular numbers of rows and columns of panes. Multiple new panes may be added simultaneously, in rows or columns, or in other arrangements. New panes also may be created based on direct movement of individual pane edges rather than partitions, thereby providing users a wider range of pane creation options and finer control of the pane creation process.

Another alternative method is to frame new pane rectangles directly without other reference to any existing partitions or panes. Instead, by first clicking at a given point within the tiler and then dragging the mouse to describe a new pane rectangle, a pane can be placed anywhere within the tiler. Existing panes which intersect the new pane rectangle, can then be automatically adjusted so as to accommodate its fitting into the tiler. This can be done by moving the edges of intersecting panes into alignment with the newly added rectangle. In a like manner, a free-floating window may be placed or docked against any of the exterior or interior partitions, and in so doing, outline a new pane rectangle. The free-floating window can then be associated with a new pane created within this rectangle and thereby be included into the tiler.

Pane Removal and Deletion

A pane can be removed from a tiler either by deleting the pane, hiding it or by minimizing it (displaying it as an icon or in another form). When a pane is deleted, the tenant application window or object is deleted or destroyed and the pane data structure 215 is deallocated and removed from the tiler's pane array 333. When panes are hidden or minimized, the pane data structure is not deallocated and is not removed from the pane array. Instead, a pane-shown flag 344 is cleared in the pane data structure 215 to indicate that the pane is not shown, and is hidden or minimized. When the pane-shown flag is clear, the pane is ignored during recreation of the partition arrays and the tenant application window or region is hidden.

When a pane is removed from the tiler by deletion, hiding or minimizing, the remaining panes may be resized to accommodate the space vacated by the removed pane such that there are no gaps in the tiler. The space vacated by the removed pane can be used to grow other panes in the tiler. Various pane configurations present different options for assigning the removed pane's space to other panes, and various methods can be used to determine which panes should acquire portions of the vacated space. Such methods may be to reallocate the space evenly among surrounding panes, to divide the space based on the proportional sizes of surrounding panes, to reposition the panes so that their edges would come into alignment with other partitions, to automatically reconfigure the tiler in a predefined configuration or to reallocate the space in other ways.

Various methods may be used to preserve the configuration as much as possible and limit it alteration. This can be done, for instance, by finding a neighboring pane having an edge that is coextensive with an edge of the removed pane. If such a neighboring pane is found, the removed pane's space is assigned to this neighboring pane.

For example, in FIG. 20D, if pane 852 were to be removed, pane 853 would acquire the removed pane's vacated space because the right edge of pane 853 is coextensive with the left edge of pane 852. The resulting pane configuration would be similar to that shown in FIG. 20A with pane 853 being substituted for 852. This would be done simply by modifying pane 853's exterior rectangle 347, so that the exterior rectangle's right coordinate would be equal to the removed pane's right coordinate. Pane 853's border flags 343 would also be modified to reflect the fact that it was now a right tiler border. Once the pane has been removed and its vacated space has been transferred to other panes, the partition arrays are reconstructed, the panes are repositioned and the new partitions are displayed.

Other configurations of surrounding panes present different options for transferring of the removed pane's space. For example, in FIG. 20D, if pane 853 were to be removed, both panes 851 and 852 would be suitable candidates to acquire the vacated space because both panes have edges coextensive with edges of the removed pane. In such a case, a number of different things could be done. Either of the two neighboring panes could acquire the space, or both of the neighboring panes could acquire the space divided evenly or based on their proportional sizes or based on application rules.

In a preferred embodiment, only a single pane acquires the vacated space when there are two or more neighboring panes which have edges coextensive with the edges of a removed pane. The selection of which pane among several choices should acquire the removed pane's space is done by precedence rules. Precedence is given first to panes above the removed pane, then to panes below, then to panes to the left and finally to panes to the right. By giving the space to a single pane only, the alteration of the pane configuration is kept to a minimum. While the precedence rules are arbitrary, by using such a standard sequence of preferential selection, a consistent behavior is presented to the user. Other methods may be employed to provide the user freer control over which panes acquire the deleted pane's space. In this case, when pane 853 of FIG. 20D is removed, pane 851 would acquire all of the vacated space because panes to the left are given precedence over panes to the right. The resulting layout would be that shown in FIG. 20B. Similarly, if pane 854 of FIG. 20D were to be removed, panes 851 and 855 would both have edges coextensive with edges of the removed pane. In this case, the same precedence rules would cause pane 851 to acquire the vacated space because panes to the top have precedence over panes to the right.

A neighboring pane which has an edge coextensive with an edge of the removed pane may not exist in some configurations. For example, if pane 857 of FIG. 20F were to be removed, no such single neighboring pane exists. A situation of this sort may be handled by searching for a group of two or more panes which have extendable edges such that the combination of two or more edges are coextensive with one of the edges of the pane being removed. In this case, the left edges of panes 851 and 854 together are coextensive with the right edge of pane 857, and when pane 857 is removed, both 851 and 854 may acquire the vacated space by each growing to the left. In the event that no single pane can be assigned the vacated space, and there is more than one combination of multiple panes which could be assigned the space, the same precedence rules given earlier are used. Combinations of panes above the removed pane would be given highest precedence to acquire the vacated space, with combinations below, to the left and to the right having lesser precedence.

Figure 22A:
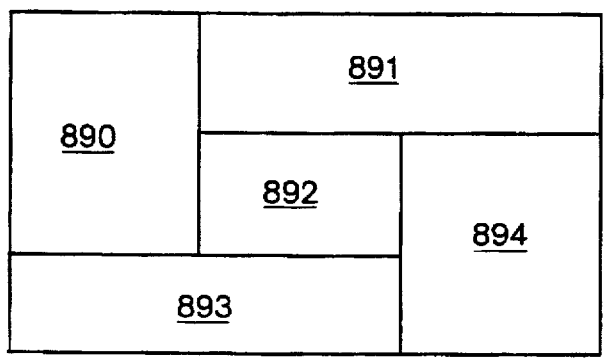
FIGS. 22A–22B illustrate pane deletion.
Figure 22B:
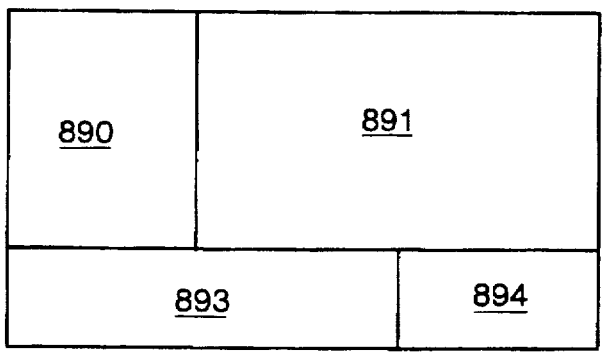

There are still other pane configurations in which no single pane or group of panes has an edge or composite edge which is coextensive with one of the edges of the pane being removed. For instance, in FIG. 22A, were pane 892 to be removed, no combination of surrounding pane edges is coextensive with one of the removed pane's edges. Instead, using the top, bottom, left, right precedence rules, a search can be performed to find a pane which simply borders the pane being removed, without being coextensive. That pane can then be grown so as to acquire all of the removed pane's space. In such cases, additional panes may have to be reduced in size to accommodate the growth of the acquiring pane. This is the case when pane 892 of FIG. 22A is removed. The pane above 892, pane 891, is selected to acquire the vacated space. Because 891 borders 894 in addition to the deleted pane 892, growth of 891 causes pane 894 to be reduced in size. The resulting pane configuration is shown in FIG. 22B.

In such configurations, if the growth of one pane would cause another pane to be reduced to less than its minimum width or height, alternative panes can be selected to acquire the vacated space. In the situation where any growth of a neighboring pane would cause at least one other pane to be reduced to below a minimum dimension, other pane configuration modifications of various sorts can always be made to allot the removed pane's space to other panes in the tiler.

Finally, when only a single pane is visible in the tiler, removal or deletion of that pane can be handled in various ways, depending on application requirements. In such a case, removal or deletion can be simply disabled; removal can cause the tiler itself to be deleted; an untenanted pane or other default pane can replace the removed pane; or other hidden panes can replace the removed pane.

Pane Contents

Application regions and objects can be placed, sized and used in panes in a variety of ways. In a preferred embodiment, applications are associated with panes through the tenant window field 345 of the pane data structure 215. Applications or application regions may also be associated with and contained by panes through other means, such as by pointers or references to application objects, via application callbacks or through auxiliary application data. A pane may also exist in an untenanted state, or may be tenanted by an empty or stub tenant window. In such cases a pane may appear to not exist—that is, a pane may appear as a gap between other panes.

Ordinarily, when a pane is created, a tenant window or other application content is assigned to the pane for display and containment by the pane. Depending on the reason for and mode of pane creation and also depending on the sequence of application or user steps taken to create the pane, a tenant window or application may or may not be immediately associated with the pane. For instance, when a saved or predefined layout is restored, new panes may be created containing specific tenant windows. In other situations, such as when a new pane is created by partition movement, an additional step may need to be taken by the user to assign a pane tenant or application contents to the pane. Alternatively, a user may first select an application object and then enter pane creation mode to outline a new pane. When the new pane is then created, the pre-selected application object is automatically associated with the pane.

A default new tenant window can be registered by an application. When a new pane is then created with no specified tenant, the default tenant window can be created immediately and directly associated with the pane. Lacking such an application-defined default tenant, the pane can remain untenanted. The user can then, or at a later time, select a particular tenant or application object to be placed into the pane. This can be done, for instance, by pressing title bar button 261 which activates a popup menu for selection of the tenant. Alternatively, a tenant may be associated with a pane by selecting a tab or menu item, or by other means. Such association of a tenant with a pane can be effected at any time (except when disabled or prevented by the current application), allowing the user to easily configure applications within the panes of a tiler.

Applications can be distributed among panes and associated with panes in a variety of different ways. For example, the present invention can be used with database applications for simultaneously displaying lists of records, fields of a selected record in the list, and graphs, calendars and multimedia images relating to the records or fields of a selected record, each in an associated pane. Alternatively, panes can be used for entirely distinct applications such as word processing, calendars and games. A tiler of the present invention can contain any number of panes and partitions, and there is no fixed maximum number of panes and partitions. As a result, the present invention could be used for a spreadsheet with each pane corresponding to a spreadsheet cell. Such a spreadsheet application could permit ad hoc alteration of cell, row and column arrangement, sizing and symmetry for a variety of purposes.

An application can be connected or associated with a pane by maintaining references to the application in the pane data structure 215. Such references may be pointers, handles or indices to windows, data structures, callback functions or application objects. In a preferred embodiment, the tenant-window field 345 provides a simple way of associating a tenant application's window handle with a pane of the invention.

Since the association of pane and tenant can be simply maintained, applications can easily be reassociated with and moved among various panes. For example, an initially untenanted pane may have an application associated with it by the user's selecting a particular application from a popup menu or other means. The selected application would then be created and its window handle or object pointer inserted into the tenant window field 345 so as to associate it with the pane and so that it would be contained by the pane. If the user then wished to associate another application with the pane, a new application could then be selected and created using similar means. The first application would then be either hidden or deleted or otherwise removed from association with the pane. The new window handle or application object would then re-instantiate the pane's tenant window field in order to associate the new application with the same pane.

Pane contents can also be easily exchanged simply by swapping the contents of the tenant window field 345 of two panes, adjusting the individual tenant windows to fit in their new pane containers and redisplaying both. This has the effect of causing two individual pane tenants to change locations. Exchange of pane tenant locations can also be accomplished without altering the association between a pane data structure and its tenant. This can be done by the alternate method of exchanging the positions or exterior rectangles 347, of the two panes, and redisplaying as above.

Drag-Drop Methods

Swapping of pane contents and positions can be further facilitated by using the commonly known drag-drop method. In this case, a first, or source pane can be selected by pressing and holding the mouse button while over the title bar area, and beginning to move the mouse while the button remains held down. This initiates the drag operation which continues while the mouse button is held down and until the mouse button is released, which effects the drop operation. The drop may also be aborted by pressing the escape key or by other means. Other means may also be used to select a pane for drag-drop operations, such as by holding down the shift or other special key while selecting the pane. Such other means of initiating drag-drop may be necessary in situations where the title bar is not visible, or for other reasons.

As the mouse is moved with the button held down, the drag operation continues. As the mouse is positioned over other panes, or target panes, which can accept a dropped pane, a special drag-drop cursor is displayed or other user feedback is given to indicate that a drop can occur. When located over the source pane or other pane which, for application or other reasons cannot accept the dropped pane, a special cursor or other user feedback can be shown indicating that a drop operation cannot be done. Once the user locates the cursor over a chosen target pane with which the source pane is to be exchanged, the mouse button is released, effecting the drop. The tenant windows of the two panes can then be exchanged by exchanging the contents of the tenant window fields 345, adjusting and resizing the tenant windows and redisplaying as described above. Alternatively, the same end result may be accomplished by exchange of the exterior rectangle dimensions 347 of the two panes, and recreating the partitions.

Drag-drop swapping of panes (or drag-swap), provides an extremely convenient mechanism for the user's arranging of panes in a non-overlapped tiled layout. Similar application-specific drag-drop operations can also provide additional convenience in creating and distributing particular pane tenants such that multiple panes have related contents. For instance, a tenant application showing a monthly calendar in a source pane, may allow a particular day to be selected for a drag-drop operation. When dropped on an untenanted or other target pane, a new daily calendar tenant window can be created and inserted into the target pane, showing the hours and appointments for that day. If the target pane were tenanted, that pane could be either destroyed or hidden based on application requirements.

Additionally, drag-drop operations might include outlining of new pane rectangles. In such a case, a source object could be selected, a new pane rectangle could then be outlined, and upon completion, a new pane would be created and the selected object dropped into it.

Drag-swap operations are not limited to the panes of a single tiler. A pane may be selected in one tiler and swapped with a pane of a second tiler. Another configurable feature of the present invention can provide for automatic deletion of untenanted or empty panes when drag-swapped with any other. This further facilitates layout management and manipulation.

Drag-drop or other methods may be used to perform other reassociation of panes with tilers. One such use of drag-drop is to provide a method for "tearing off" one or more panes from source tilers. This can be done by selecting a pane or a set of panes and dragging it to an area outside the tiler. Panes torn off in this way may be caused to be no longer associated with their containing tilers.

For instance, new tilers can be automatically created when the mouse button is released and the torn-off panes are dropped. The torn-off panes can then be removed from the source tilers and reassociated with the newly created tilers. Alternatively, the panes can remain undeleted in the source tilers, and duplicated in the new tilers. When the torn-off panes are attached to new tilers in such a way, various approaches may be used for automatically arranging the panes, including using the panes' current relative arrangement, or using automatic arrangement according to layout guidelines or styles, as described below.

Torn-off panes may also be simply deleted, hidden or minimized, and not associated with any new tiler. Still another alternative method is to delete the torn-off panes from their tilers, but without destroying the pane tenants. That is, the tenant windows or application objects remain active, even though the panes are deleted. In such a case, the pane tenants may be reassociated with the interface of an overlapping window system, so as to be free-floating. Such a usage of the tear-off feature can be useful in an application which allows windows to be freely attached to and detached from tilers of the present invention.

Such tearing off of panes may also be used in conjunction with pane sets. Panes may be marked for selection, and multiple panes may be selected to form particular pane sets. Various application-specific operations may be performed on such pane sets. As well, a pane set can be arranged using similar methods as are used for general tiler layout arrangement, or all panes in a pane set may be hidden, deleted or minimized. Pane sets can also be drag-swapped with other pane sets in the same or in other tilers.

While tenant windows can be easily associated with and separated from panes of the present invention, there are certain practices which should be adhered to by the tenant windows. As is obvious, the tenant windows should remain within the pane's space, and should be responsive to movement and adjustment of the pane. Additionally, the tenant window's border and title bar areas should ideally be displayed in conformance with the other panes of the tiler and the user's configuration. Tenant windows may also be required to provide certain user interface features and devices such as being responsive to drag-drop initiation, responding to drag-drop events, and implementing various title bar buttons.

In order to provide conformance of appearance, behavior and functionality among panes, an embodiment of the present invention may provide library functions. These library functions can provide a relatively simple way to build applications, or application objects or windows which can reside as tenants of any of a tiler's panes.

Attachment to Existing Overlapped Window Interfaces

The interface of the present invention can be incorporated into an application in a conventional manner, such as by calling library functions provided in an embodiment of the invention. Such incorporation of the interface into an application is done explicitly and by design during the application's development. Such an application may also conditionally enable or disable a non-overlapped tiling interface.

Using less common techniques, however, the invention may automatically install a non-overlapped tiling interface in an application explicitly designed for use with an overlapped windowing system, and not intentionally designed or developed for use with a single plane non-overlapped tiling system. That is, an application which does not natively use a non-overlapping interface, can be taken over and have a non-native non-overlapping interface installed by the invention. Further, the automatically installed non-native interface may correspond to the interface 200 of the invention.

Such a non-native non-overlapped interface can be installed in an application by associating windows of the application with panes of the non-native interface, and by redirecting the window procedures to procedures of the invention. Such redirection can be accomplished by what is commonly called subclassing or hooking in the Microsoft Windows environment. Other mechanisms for redirecting handling of window events exist in other operating systems. Through such redirection, window events and messages relating to moving, sizing, display, mouse activity and other interface concerns, can be intercepted for pre-processing and post-processing.

Subclassing is performed by installing a new window procedure, or subclass function, (e.g., one implemented by the present invention), in an existing application window. This causes all messages intended for the subclassed application window to be first routed to the subclass function. Some selected set of the messages is handled by the subclass function and the messages can be forwarded, in a perhaps modified state, to the original window procedure. As most messages are forwarded on to the original window procedure, most of the application's original functionality is maintained, and the application is augmented rather than subverted. Thus, a non-overlapping tiling interface can be added to an application with little other effect. For applications which consist of many individual windows the advantages of non-overlapping tiling can be significant.

In one embodiment, a non-native non-overlapping tiling interface of the present invention is automatically installed in Windows 3.1 MDI (Multiple Document Interface) applications. These applications, including the Program Manager and File Manager, have been implemented for use with overlapped window interfaces, and have not been not been intentionally designed for use with non-overlapped interfaces. However, by associating the applications' windows with panes and tilers of the non-overlapped interface, and by redirecting the applications' window procedures to subclass functions of the invention, the applications can be automatically given a non-overlapped tiling interface.

An MDI application typically includes MDI child windows, an MDI client window, which is the direct parent of the child windows, and an MDI frame window which is the parent of the MDI client window. When the non-overlapped tiling interface is installed, several things occur: a tiler 205 is created; its client window field 307 is instantiated with the MDI client window; its frame window field 306 is instantiated with the MDI frame window; panes 215, corresponding to MDI child windows, are allocated and stored in the pane array 333; the panes' tenant window fields 345 are instantiated with the MDI child window handles; subclass routines are installed for MDI frame, client and child windows; panes are automatically arranged according to a saved layout or layout style (step 702); scrolling parameters are initialized and partition arrays are created (steps 703, 704); and the remaining steps 705–707 of the layout modification sequence are performed.

Once the subclass functions have been installed, they receive the rerouted window messages. While most types of messages can be ignored and simply forwarded to the original window procedure, certain messages are trapped and acted upon. For the most part, these are messages which allow the user interface to be appropriately displayed, to handle sizing, movement and other state messages and notifications, and to respond to mouse, keyboard and other input messages.

Partitions can be displayed and implemented between panes by handling the MDI client window's WM_PAINT message. Standard display and behavior of child window sizing borders can be altered by handling many of the non-client messages such as WM_NCPAINT, WM_NCCALCSIZE, WM_NCHITTEST and others.

For example, when a mouse click occurs in the border regions of MDI child windows, overlapped window sizing and movement would normally occur. To alter this native behavior, the MDI child window subclass function can trap the WM_NCLBUTTONDOWN message which occurs when the left mouse button is pressed in a border or other non-client area of a window. Rather than forwarding the message to the original window procedure, the non-overlapped tiling interface's partition movement routine can be invoked. Pane and partition painting, cursor display and various other window events can be similarly handled.

When MDI child windows are created and destroyed by the application, corresponding pane data structures 215 are added to and deleted from the tiler's pane array 333. The WM_MDICREATE message is used to request creation of an MDI child window. When this message is received by the subclass function, the following steps occur: a pane data structure 215 is allocated; the message is forwarded to the original window procedure; the original window procedure creates a new MDI child window and returns the new window handle to the subclass function; the subclass function associates the new window with the new pane by instantiating the pane's tenant window field 345; the new MDI child window's subclass function is installed; the new pane is positioned in the tiler by various methods; and the remaining steps of the pane modification cycle of FIG. 11 are executed.

In somewhat the reverse, pane deallocation occurs on receipt of a WM_NCDESTROY message which indicates that a window is about to be destroyed. When received by the MDI child's subclass function, the subclass is uninstalled, the pane data structure is discarded, the partition arrays are rebuilt and the message is forwarded to the original window procedure for completion of the standard destroy window processing.

For applications such as the Program Manager, which may ordinarily have large numbers of overlapped windows, the advantages of the non-overlapped interface can be significant, particularly because users very often find it both necessary and difficult to conveniently arrange and rearrange the child windows. By manipulating the partitions of the tiler, users are able to easily organize and manage arrangements of multiple windows; easily find windows; add and delete windows as needed; and conveniently place the windows for their special purposes. Additionally, because the installation of the non-native interface occurs without the need for software modification by the application provider, the features can be readily made available to the user.

Pane Arrangement Methods

Panes may be arranged in various predefined configurations. This may be done by functions which create new pane layouts according to particular layout guidelines or styles. Such layout styles may also be termed functional layouts, and can be applied to variable numbers of panes in variably sized tiler areas, such that pane placement may be relative rather than fixed. Such functional layouts are methods for reapportioning a tiler's space among its panes and are distinct from saved and restored layouts which generally deal with explicit configurations.

Layout styles might include simple distribution of panes in vertical or horizontal bands; T layouts, in which a specified number of panes are placed in horizontal bands at the top area of the tiler and remaining panes are distributed in vertical bands beneath it; inverted T layouts which are upside-down T layouts; E or inverted E layouts which are T layouts rotated 90 degrees; and matrix layouts in which panes are distributed in a grid of rows and columns of approximately equal size. For any given layout style, there may be any number of variations. For example, in the matrix layout style, one variation might give preference to greater numbers of rows than columns. In another variation of the matrix layout style, when the number of panes cannot be conveniently divided into rows and columns, a first or last row or column might contain fewer or more panes than other rows or columns.

Because such functional layouts are function generated, there is an no limit to the variety of layouts that can be generated. Layout-generating functions might be geared toward application considerations and rules; might be sensitive to the tiler's dimensions, number of panes or preferred dimensions for particular panes; might consider the location of certain partitions; might manage particular orderings of panes; or might involve methods for dynamic pane arrangement based on various formulas, user preferences or patterns of use.

Layout generating functions operate by reapportioning the tiler's area to each visible pane in some established, function-specific pattern, and resetting the panes' exterior rectangles, 347, to create new pane locations. These functions may also give each pane appropriate border flags 343, and other attributes as necessary. A further consideration when applying layout styles, is that pane edges may be required to be positioned in conformance with partition auto-alignment features.

As with other layout modifications, layout-generating functions operate within the context of the pane layout modification cycle of FIG. 11. The user selects a particular arrangement method from a popup menu or through other means (step 700); the appropriate arrangement function is dispatched (step 701); the arrangement takes place by appropriate division of the tiler's space, reassignment of panes to the generated positions and modification of pane border flags as just described (step 702); and the remaining steps of the cycle occur as discussed earlier (steps 703–707).

Arrangement functions can also be used with an automatic arrangement facility which may be enabled at various stages of the layout's evolvement. In particular, if automatic arrangement is enabled, when panes are deleted or otherwise removed from the tiler, the current layout style can be reapplied for the changed number of panes. Similarly, layout styles or guidelines can be automatically applied when a new pane is added through an application or other action, where no new pane rectangle is given for placement of the new pane. For instance, a multimedia encyclopedia application might provide a button for showing a drawing related to a particular entry. When the button is pressed, a new pane is created and can be automatically positioned according to the current layout style, or by layout-generating callback functions. In like manner, when a pane is deleted or hidden, the layout-generating function can be automatically reapplied. Automatic arrangement can also be used at other times and can be enabled and disabled by the user as desired.

Figure 23A:
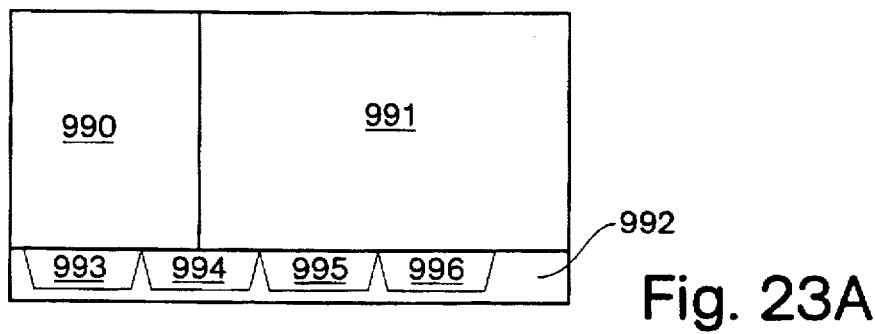
FIGS. 23A–23B illustrate the use of tabs according to the present invention.

A maximized layout is a layout in which a single pane is displayed and occupies the tiler's entire display area while all other panes are hidden. A half-maximized layout, an example of which is shown in FIG. 23A, has two panes which together occupy the tiler's display area, with remaining panes hidden. This figure also depicts a set of tabs 993, 994, 995, 996, grouped in a tab bar 992. The tabs and tab bar are not considered part of the tiler proper, but are auxiliary user interface devices for selection and activation of hidden and inactive panes as discussed below.

In the half-maximized layout, the left-hand pane can contain the tiler's main tenant window and the right-hand pane position can be occupied by secondary panes which can be successively viewed by selection of tabs or other means. The main tenant window can be defined by the application implementing the tiler and can be obtained by the main pane reference handle or pointer, 317. Such a pane configuration allows, for example, a database browsing window as a navigator or main window, and auxiliary windows displaying related records and data.

Title bar button 266 provides a convenient way to rearrange the tiler in the maximized layout, causing the pane to which the title bar belongs to be maximized, and remaining panes to be hidden. Button 265, similarly, can be used to produce a half-maximized layout. Button 264 restores the previous non-maximized layout as will be discussed below. The remaining title bar buttons are 263, which causes the pane containing the button to be minimized or hidden; 261, which activates a popup menu for redisplaying a hidden pane or selecting a new pane tenant; and 262, which activates a popup menu containing tenant application options. Such title bar buttons may be differently configured and used for other purposes, and other means may be used for accessing the functions implemented by each of these title bar buttons.

When pane layouts are modified, an extra copy of each pane's location is stored in the pane's normal rectangle 350. This extra copy is not made when the layout is in either the maximized or half-maximized layouts, but only when in a normal, non-maximized layout. When the layout is later in one of the maximized layouts, the previous normal layout can be restored by pressing button 264 or by other means. That is, each pane's exterior rectangle 347, is re-instantiated with the contents of its normal rectangle, 350, hidden pane tenants are redisplayed, and the rest of the layout modification cycle of FIG. 11 (steps 703–707), is then executed.

Tiler layouts can additionally be saved and restored by writing a layout to a file or other storage when the tiler is closed, and reading the layout back from storage when the tiler is reopened. Pane content and tenant information can be saved along with such saved layout information. This provides the convenience of being able to return the layout to where the user left off when last working with the tiler. This capability may also be used at other points in the tiler's lifetime to apply various predefined layouts to current pane arrangements. Such predefined layouts or templates may be defined by the system, the application, or may be configured by the user. The applying of such a layout again takes place within the pane layout modification cycle of FIG. 11—once the layout of panes is applied, partition construction and remaining steps of the cycle are executed.

The save and restore layout features are distinct from the layout-generating functions which implement arrangement methods for variable numbers of panes. In contrast, the save and restore layout functions generally operate only with the numbers of panes in the tiler when stored, and most often use the absolute pane positions of the stored layout rather than relative positioning.

A series of layouts can be tracked and stored over time to provide a layout history. The layout history can be configured by the user or the application to include any arbitrary maximum number of layouts, and can be stored in a file or other storage and restored in the same or in a later session. By using the layout history, any previous layout can be re-obtained by the user or application. Particular layouts can also be named or otherwise identified by the user to facilitate later access. Further, by selecting series of previous or succeeding layouts in the layout history, undo-layout and redo-layout functions can be provided. Panes present in one layout which are not present in another layout can be hidden or deleted, and later redisplayed or recreated as needed, depending on application requirements.

Virtual Pane Types

A pane in a non-overlapped tiled interface generally describes a visible region of a display area. This sense of a pane can be extended to further include the notion of virtual or non-visible regions or panes. Various sorts of virtual panes may be distinguished, including scrolled-off or outer panes, untenanted or empty panes, hidden panes, minimized panes and inactive panes.

Scrolled-off or outer panes are panes which are fully or partially outside the tiler's display area. These may be contained, however, within the tiler's internally maintained extent, 322. Such outer panes may be brought back into view by scrolling, dragging, or by other mechanisms which adjust the tiler's extent or display area.

Untenanted panes are a second sort of virtual or non-visible pane. Such panes may have no active tenant window or application object associated with them, or alternatively, they may be associated with a stub or empty tenant window. Depending on display parameters, such untenanted or empty panes may not necessarily be visible, and may appear as gaps between other panes or appear to be part of, or otherwise undistinguishable from the tiler's background area. Such untenanted panes may be used in conjunction with hidden partitions to provide applications the appearance of free-form arranging and positioning of application objects, as shown in FIGS. 21A–21C.

Hidden and minimized panes are other kinds of virtual panes. Both hidden and minimized panes may be variously referenced and accessed by popup menus, tabs or other user interface devices. Minimized panes additionally may be displayed as icons or in other forms. When a pane is hidden or minimized, it is removed from the display area of the tiler and remaining visible panes may be adjusted to occupy its vacated area. The hidden or minimized pane's data structure 215, however, is not deallocated, and remains present in the tiler's pane array 333. A pane-shown flag 344 is cleared, the tenant window is hidden, and the pane's exterior rectangle 347 may also be nulled out. Other fields of the pane's data structure 215 remain unchanged and the pane generally remains associated with its tenant. The hidden or minimized pane and its associated tenant may be redisplayed later in its prior location or in other locations.

Inactive panes are another type of virtual pane. These are tenant windows or application objects which have been registered with or are otherwise known to the system and which can be activated by invoking registered callback functions, sending creation request messages or through other means. Inactive panes can be displayed, selected and activated through the use of menus, tabs, icons and other devices.

When an inactive pane is activated, several steps may be performed, including: creation of a new pane data structure, 215; creation of the registered tenant window or application object by calling a registered callback function or other means; association of the tenant window with the pane data structure; positioning of the pane in an area of the tiler by setting the pane exterior rectangle 347; and making the tenant window visible within the pane. The area which the new or activated pane is to occupy can be allotted from the tiler's area by layout-generating functions as discussed above; by acquiring a portion of the area of one or more panes currently present in the tiler; by removing one or more panes from the tiler and replacing them with the new pane; by growth of the tiler; or by other means.

Selection and Placement of Panes in a Tiler

Figure 23B:
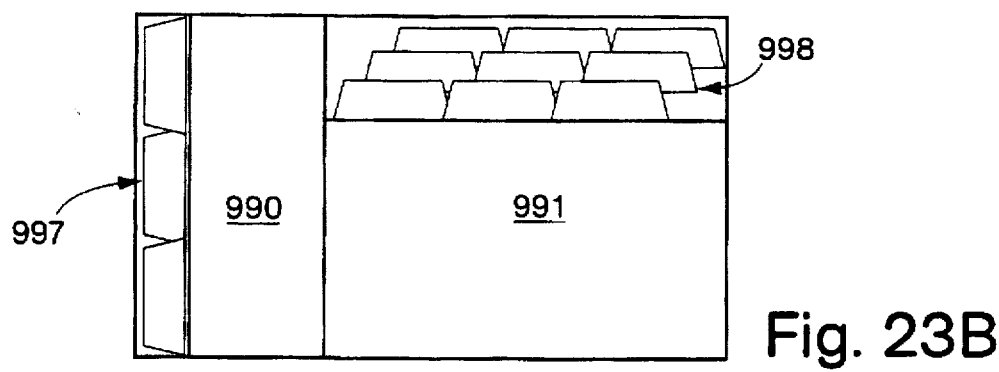

FIG. 23A illustrates a layout in which certain panes 990, 991 are shown and others are hidden, minimized or inactive. A set of tabs, 993, 994, 995, 996, are grouped in a tab bar 992. These tabs represent and provide access to particular panes, including the hidden, minimized and inactive panes. Variable numbers of tabs may be used, as needed, and may be arranged in various alternative ways including those shown in FIG. 23B, in which two sets of tabs 997, 998 are displayed. While the tabs in FIG. 23A reside outside the tiler's area, the tabs in FIG. 23B reside inside the area of the individual panes, and alternatively may reside elsewhere within the tiler's space. Tabs may be selectively hidden, shown, or conditionally shown in connection with particular layouts (e.g., for maximized and half-maximized layouts).

By selecting one of the tabs 993-996, a shown pane, such as pane 991, can be hidden and an alternative pane, referenced by the tab, can be made visible in its place. This can be accomplished by clearing the pane-shown flag, 344 in pane 991; hiding pane 991's tenant window; setting the replacement pane's pane-shown flag; instantiating the replacement pane's exterior rectangle 347 and border flags 343 with the exterior rectangle and border flags of pane 991; and finally, completing the layout modification cycle to recreate the partitions and display the panes by executing the remaining steps 703–707 of FIG. 11.

Tab selection may be used in any configuration of panes to effect display of virtual and other panes referenced by a given tab. In a preferred embodiment, tab selection may cause the tab-referenced pane to replace the current or active pane. If the referenced pane is already visible, it may simply be made the current or active pane without changing position, or, alternatively, its position may be swapped with that of the active pane. Alternatively, panes at certain defined positions may be designated for replacement. For example, in a half-maximized layout, the pane at the right-hand pane position may be designated for replacement so that the left-hand pane, containing the main window, is unchanged. Other layout-specific or application-specific rules might also be used for designating the pane to be replaced.

Other alternative methods may be used for tab selection of panes. For instance, rather than replacing a given pane, a tab-referenced pane can be simply added to the tiler along with the currently displayed panes. Positioning of the newly added pane might be done in any number of ways, including: by automatic arrangement by a layout-generating function; by positioning the new pane at a predefined location, e.g., the bottom right corner; by appropriating space from the current pane to accommodate the new pane; or by growing the tiler in a particular direction to accommodate the new pane.

In that tabs present the user a set of choices, they are similar in functionality and usage to menu items and push buttons. Because of this, all of the functionality and uses discussed in relation to tabs can also be implemented with various sorts of menus and buttons, and with other methods for presenting choices to the user. For instance, by selecting title bar button 261, a popup menu is displayed and may present the same choices as are presented by a set of tabs. Such a menu may also be displayed through other means such a right mouse button click in a given pane's area.

Tiler Sizing and Scrolling

Figure 24A:
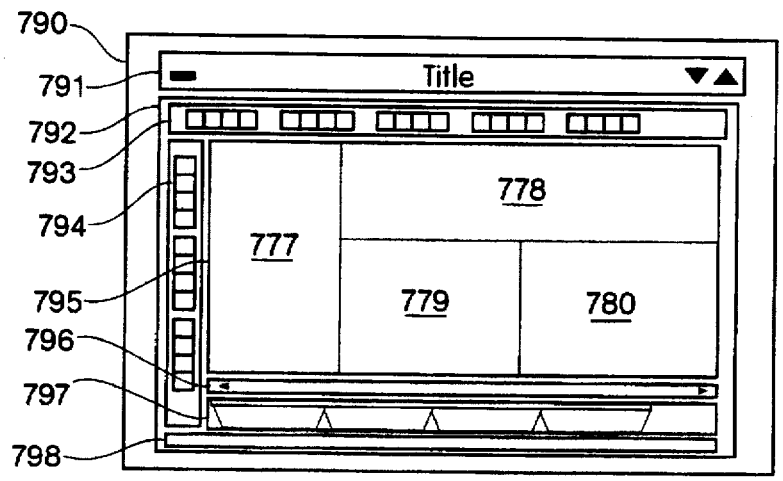
FIGS. 24A–24F illustrate operations of the present invention in connection with alterations of tiler display dimensions.

FIG. 24A depicts an exploded view of a tiler 795, contained by a tiler parent window 790, belonging to an example application. The tiler includes the panes 777–780. The tiler is also shown in FIGS. 24B–24F, removed from the parent window. In these diagrams, the tiler's visible display area 776, also termed its client rectangle, is additionally shown in an exploded form. The client rectangle is stored in the tiler data structure's client rectangle field 321. A tiler of the present invention may be used in conjunction with such a containing tiler parent window as 790, or may be used with various other sorts of tiler parent windows or, alternatively, may be used independently of any tiler parent window.

A tiler parent window 790 may also include various other auxiliary windows or regions such as a title bar 791, a frame 792 (which may also be termed the tiler parent window's client rectangle), tool bars 793, 794 containing various application buttons, a horizontal scroll bar 796, a tab bar 797 and a status bar 798. Various other auxiliary windows may also be used, such as rulers, additional tool bars, vertical scroll bars, particular application windows and others. All of these auxiliary windows are typically placed in various fixed or configurable locations within a frame 792, and the remaining area can be given over to a tiler 795. As such auxiliary windows are resized, repositioned, added or removed, the containing application may automatically resize other auxiliary windows and the tiler.

A tiler's display area may be resized by direct modification by the user or in various indirect ways. When a containing tiler parent window such as 790 is directly resized by the user, the component auxiliary windows and the tiler may also be resized. Also, as the user adds or removes auxiliary windows, the application may adjust the allotment of space among auxiliary windows and the tiler so that the tiler's dimensions may be altered.

When a tiler is resized, several methods may be used to reapportion the changed display area among contained panes. Panes may be clipped or cut off and grown as needed, they may be proportionally resized and/or provided with scroll bars to give access to other portions of the tiler.

Figure 24B:
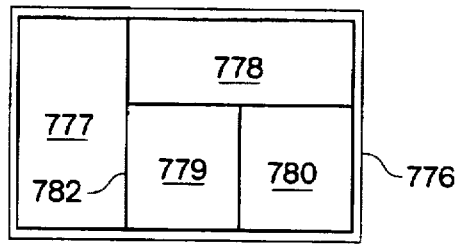
Figure 24E:
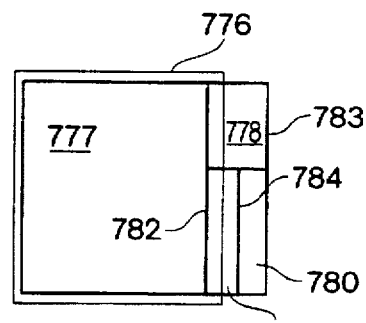
Figure 24C:
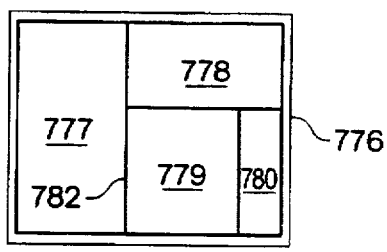

FIG. 24C shows the same arrangement of panes as FIG. 24B, but with a reduced display area 776. In simple cases, right and bottom border panes may be clipped so that their right edges are aligned with the right edge of the tiler's display area or client rectangle 321, as shown in FIG. 24C. Bottom border edges can be similarly clipped so as to be aligned with the bottom edge of the tiler's display area. Thus, because the display area has been reduced in width, panes 778 and 780 are clipped to fit the tiler display area 776. This can be done by modifying the pane's exterior rectangles 347.

This method of clipping keeps the use of scroll bars and the alteration of partition locations to a minimum. Such simple clipping, however, can't always be done because one or more border panes may be reduced to less than the minimum width or height.

Figure 24D:
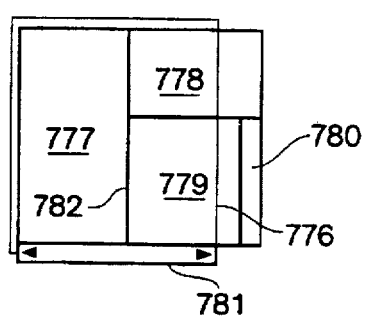

Because of the minimum pane width and height constraints, where such clipping would otherwise reduce a pane to less than its minimum width or height, the pane is clipped only so far as that minimum. As shown in FIG. 24D, when the tiler's display area is sufficiently reduced, simple clipping would cause pane 780 to be reduced below a minimum width. As a result, pane 780 is only partially clipped and is not able, using this method, to be fit into the display area of the tiler. In consequence, the tiler's extent, which is the combined extent of all panes in the tiler's layout, will at times exceed the display area.

FIG. 24D also illustrates a horizontal scroll bar 781 which can be used when the tiler's extent exceeds the display area. Horizontal and vertical scroll bars can provide access to portions of the layout which would otherwise be inaccessible. When the tiler is grown or the layout is modified so as to allow the extent to be fit into the display area, the scroll bars can be eliminated. Panes located fully or partially outside the visible display area are considered outer or scrolled-off panes, as distinct from a hidden pane. While scroll bars (and other methods) may be used to bring such outer panes into view, hidden panes cannot be brought into view in this manner and must be explicitly redisplayed by a user or application action.

When a window (such as a tiler) is resized, it is also repositioned, so that at least one of its borders are relocated. In a preferred embodiment, however, the same clipping process occurs regardless of which tiler border is repositioned. While the tiler's origin (top left corner) may be moved, all pane origins remain unchanged relative to the tiler's origin.

Using a method similar to clipping, when tilers are resized larger, right and bottom border panes are grown to fit the tiler extent. Specifically, if the tiler display area 776 of FIG. 24D were adequately increased, pane 780 would become visible and the sizes of panes 778 and 780 would be increased to obtain layouts as shown in FIGS. 24C and 24B.

A tiler's extent may also be altered by pane and partition movement which can cause collapsing and shifting of panes such that panes are positioned outside the visible display area of the tiler. For example, the movement of partition 782 of FIGS. 24B and 24C to the right may cause panes 778, 779 and 780 to be collapsed to their minimum widths and shifted right. Once these panes have reached their minimum width, further movement causes them to be pushed outside of the tiler display area. This may result in configurations similar to those shown in FIGS. 24D and 24E in which various panes have been moved outside the tiler's display area 776.

Pane sizing, scrolling and clipping calculations are always performed in the context of the pane layout modification cycle of FIG. 11, and are performed at step 703, which may further include initialization of scroll bars and scrolling variables. Because the tiler sizing calculations are based upon both the tiler's extent and its display area, whenever either is modified, these calculations have to be performed again. Moreover, as the tiler's extent is the sum of the extent of the panes, any modification to the layout may also cause modification of the tiler extent, and require sizing and scrolling recalculation. As a result, the tiler sizing and scrolling calculations have to be incorporated into the layout modification cycle.

In the examples previously discussed, panes positioned outside the tiler's display area, or "outer panes," are accessed by scrolling of the tiler extent and the use of scroll bars. Outer panes may also be accessed by alternative methods which can be configured for use in the present invention. Rather than using scroll bars for access to outer panes, partition movement can be used to cause such panes to be dragged onto the display area, as well as dragged off as described earlier.

Figure 24F:
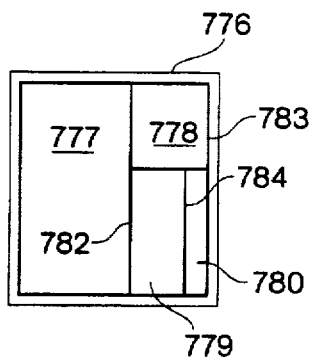

Using the drag-on method of pane and partition movement, partition 782 of FIGS. 24D and 24E can be moved to the left so as to drag or bring outer panes 778, 779 and 780 back into the display area. In contrast to other partition movement methods, in drag-on partition movement, partitions of outer panes, such as 783, 784, which are on the side away from movement, do not remain anchored. Instead, those outer partitions trail the movement of the movement-initiating partition (782) such that entire panes are brought into the display area. Thus, drag-on movement of partition 782 of FIG. 24E to the left, causes trailing movement of outer or trailing partitions 783, 784, which in turn causes panes 778, 779 and 780 to be brought back into the display area 776, as shown in FIG. 24F.

When the drag-on method is used, a partition such as 782 of FIGS. 24D and 24E, which is aligned with the edges of outer panes, may be termed a "fronting partition." Such fronting partitions may be any sort of whole, segment or cross partition, and may be specially displayed to indicate that there are outer panes which can be accessed by their manipulation. Other methods may also be used to indicate the presence of outer panes. Once all of the panes have been fully dragged into the display area, further movement left of the fronting partition 782 may cause the panes directly aligned with the fronting partition to be expanded. Alternatively, tiler border panes may be expanded, or expansion of panes may be done proportionately as they are dragged onto the display area.

Additional Aspects and Features

There are a variety of other possible aspects and features of the present invention. These features and those already described may be varied, modified, altered, adapted and configured for specific application purposes.

User and application preferences, parameters and defaults, can be set and altered for specific panes, tilers and application configurations. Such values as tiler display features, partition widths, partition visibility, visibility of untenanted panes, minimum and maximum pane widths and heights, appearance or color of partitions and pickup regions, pickup region expansion, the use of title bars and title bar content and formats, can be set and adjusted for specific panes or partitions. Additionally, individual pane edges and partitions may be individually configured for various display characteristics.

All of the foregoing values and attributes can be modified at installation time, at run time, or during development of particular applications. Such preference, parameter and default values may be stored on per-pane, per-partition, per-tiler and per-system bases, or other individual or group bases, or alternatively, may be obtained through callback functions or other means.

The tilers of the present invention can operate as overlapping windows in conjunction with other overlapping windows of an overlapped window interface. Tilers may additionally be embedded as pane tenants of other tilers of the present invention or in other non-overlapping systems to produce multiple levels of tilers.

Other methods can be used for displaying, distinguishing, discriminating among, selecting and activating co-located partitions than those already described. These could include the use of variously displayed hotspot or pickup regions, popup menus, push buttons, keyboard and mouse button combinations, title bar selection, as well as other user interface devices and mechanisms. Other methods than partition movement may be used to effect the movement, sizing and adjusting of particular panes. Panes may be directly selected alone or in combination with other panes, and may be directly manipulated, resized, repositioned or adjusted. Mechanisms of the invention may also be used to effect pane movement without resizing, and may be used in non-overlapped interfaces in which gaps between panes are permitted.

Various combinations of modifiable and configurable features and functionality provide for a wide range of uses, appearances, expressions and behavior of the present invention. Other special functionality may be made available and used in conjunction with the invention, including explicit pane sizing, direct pane selection and movement, maximum and fixed pane dimensions, movement of static-sized panes, selection of pane sets and groups, and automatic creation and deletion of panes for various purposes.

Finally, the present invention may be used in and adapted for use with a wide range of applications, including spreadsheet, database, multimedia, network, graphics, desktop, and window management applications as well as in graphic user interface (GUI) operating systems and many other applications.

Having thus described at least one illustrative embodiment of the invention, variations, alterations and modifications will be readily apparent to persons of skill in the art. Such variations, alterations, and modifications are considered to be part of and encompassed by the invention. Accordingly, the invention is not limited except as to the claims appended hereto.

What is claimed is:

1. A tiling system comprising:
    a plurality of non-overlapping panes, wherein a pane can be situated adjacent to more than one pane along an edge in a first direction, and wherein a pane can be situated adjacent to more than one pane along an edge in a second direction transverse to the first direction;
    a plurality of partitions adjacent said plurality of panes, wherein at least two of the plurality of partitions have a common end;
    means for moving one of the partitions having a common end; and
    means for simultaneously moving the at least two partitions having a common end.

2. The tiling system of claim 1, wherein the at least two partitions having a common end are aligned.

3. The tiling system of claim 2, further comprising:
    means for jointly displaying partitions which are aligned; and
    means for displaying at least one of the aligned partitions distinctly from the partitions which are aligned.

4. The tiling system of claim 2, further comprising means for simultaneously moving at least two partitions which are positioned in directions transverse to each other.

5. The tiling system of claim 2, wherein a first application region is associated with a first pane, said tiling system further comprising means for disassociating the first application region from the first pane and associating the first application region with a second pane.

6. The tiling system of claim 5, wherein a second application region is associated with said second pane, said tiling system further comprising means for associating said second application region with said first pane when said first application region is associated with said second pane.

7. The tiling system of claim 2, further comprising means for creating an additional pane from a portion of at least one of said plurality of panes.

8. The tiling system of claim 7, wherein the means for creating a new pane include first means for defining an area for placement of the additional pane by movement of at least one partition.

9. The tiling system of claim 8, wherein the means for creating a new pane include second means for defining an area for placement of the additional pane by simultaneous movement of the at least one partition and at least one other partition aligned with the at least one partition.

10. The tiling system of claim 2, further comprising:
    means for removing a first pane from said plurality of panes; and
    means for resizing at least one pane of said plurality of panes which is adjacent to said first pane to include an area defined by said first pane.

11. The tiling system of claim 2, further comprising aligning means for moving a first partition which is within a range of a second partition so as to align the first and second partitions.

12. The tiling system of claim 11, wherein said aligning means includes means for altering said range.

13. The tiling system of claim 11, further comprising:
    a plurality of predefined partition positions; and
    wherein said aligning means includes means for moving said first partition into alignment with one of said plurality of predefined partition positions.

14. The tiling system of claim 2, further comprising parallel moving means for moving at least one partition which is parallel to the at least two partitions having a common end so as to maintain a predetermined dimension for at least one of said plurality of panes, when one of the at least two partitions having a common end is moved.

15. The tiling system of claim 2 further comprising means for associating application regions of another interface with respective ones of said plurality of panes.

16. The tiling system of claim 1, wherein the at least two partitions having a common end are transverse.

17. The tiling system of claim 16, further comprising parallel moving means for moving at least one partition parallel to a first one of the transverse partitions and at least one partition parallel to a second one of the transverse partitions so as to maintain a predetermined dimension of at least one of the plurality of panes when the transverse partitions are moved.

18. The tiling system of claim 1, further comprising partition creating means for creating said plurality of partitions based upon said plurality of non-overlapping panes.

19. The tiling system of claim 18, wherein said partition creating means includes:
    edge means for identifying edges of said plurality of panes;
    matching means for determining coextensive edges of adjacent panes; and
    partition means for identifying coextensive edges of adjacent panes as partitions of said plurality of partitions.

20. The tiling system of claim 19, wherein said matching means includes:
    means for identifying common edges of adjacent panes;

means for determining whether identified common edges are coextensive; and means for iteratively expanding edges to include aligned edges of separate panes when common edges are not coextensive.

21. The tiling system of claim 18, further comprising partition set creating means for creating sets of aligned partitions of the plurality of partitions.

22. The tiling system of claim 1, further comprising parallel moving means for moving at least one partition which is parallel to one of the at least two partitions having a common end so as to maintain a predetermined dimension for at least one of said plurality of panes, when one of the at least two partitions having a common end is moved.

23. A method for manipulating panes in a non-overlapping tiling system comprising the steps of:

defining a plurality of non-overlapping panes, wherein a pane can be situated adjacent to more than one pane along an edge in a first direction, and wherein a pane can be situated adjacent to more than one pane along an edge in a second direction transverse to the first direction;

defining a plurality of partitions adjacent to said plurality of panes;

defining at least one first set of aligned partitions including at least two partitions which are aligned selecting one partition from a first set of aligned partitions; and changing a position of said selected partition so as to manipulate at least one of the plurality of panes.

24. The method of claim 23 further comprising the step of defining at least one second set of aligned partitions including at least two partitions which are aligned and which transverse to at least one first set of partitions.

25. The method of claim 23, wherein a first application region is associated with a first pane and a second application region is associated with a second pane, the method further comprising the steps of associating said first application region with said second pane and associating said second application region with said first pane when said first application region is associated with said second pane.

26. The method of claim 23, further comprising the steps of:

removing a first pane from said plurality of panes; and resizing at least one pane of said plurality of panes which is adjacent to said first pane to include an area defined by said first pane.

27. A method for manipulating panes in a non-overlapping tiling system comprising the steps of:

defining a plurality of non-overlapping panes;

defining a plurality of partitions adjacent to said plurality of panes;

defining at least one first set of aligned partitions including at least two partitions which are aligned;

displaying the plurality of partitions; and jointly displaying the at least one first set of aligned partitions distinctly from the plurality of partitions.

28. The method of claim 27, wherein the step of defining a plurality of non-overlapping panes includes the step of defining a plurality of panes wherein a pane can be situated adjacent to more than one pane along an edge in a first direction, and wherein a pane can be situated adjacent to more than one pane along an edge in a second direction transverse to the first direction.

29. A tiling system having a plurality of non-overlapping panes comprising:

means for selectively coupling at least two of the plurality of panes which are adjacent in a first direction such that the at least two panes can be jointly manipulated in a second direction transverse to the first direction when coupled and individually manipulated in the second direction when not coupled; and;

wherein the means for selectively coupling includes:

a first individually selectable control for coupled manipulation of the at least two panes; and a plurality of second individually selectable controls, each corresponding to one of the at least two panes, for uncoupled manipulation of the corresponding pane.

30. The tiling system of claim 29, further comprising:

second means for selectively coupling at least two of the plurality of panes which are adjacent in the second direction such that the at least two panes can be jointly manipulated in the first direction when coupled and individually manipulated in the first direction when not coupled;

wherein the second means for selectively coupling includes:

a third individually selectable control for coupled movement of the at least two panes adjacent in the second direction; and a plurality of fourth individually selectable controls, each corresponding to one of the at least two panes adjacent in the second direction, for uncoupled movement of the corresponding pane.

31. The tiling system of claim 29, further comprising:

means for displaying the panes, the first individually selectable control and the plurality of second individually selectable controls.

32. The tiling system of claim 31, wherein the first individually selectable control and the plurality of second individually selectable controls are simultaneously and distinctly displayed.

33. The tiling system of claim 31, wherein the first individually selectable control and plurality of second individually selectable controls are pickup regions.

34. The non-overlapping tiling system of claim 29, further comprising means for manipulating panes.

35. The tiling system of claim 29, wherein a first application region is associated with a first pane, said tiling system comprising means for disassociating the first application region from the first pane and associating the first application region with another one of said plurality of non-overlapping panes.

36. The tiling system of claim 35, wherein a second application region is associated with said other pane, said tiling system further comprising means for associating said second application region with said first pane when said first application region is associated with said other pane.

37. The tiling system of claim 29, further comprising means for creating an additional pane from a portion of at least one of said plurality of panes.

38. A tiling system having a plurality of non-overlapping panes comprising:

means for selectively coupling at least two of the plurality of panes which are adjacent in a first direction such that the at least two panes can be jointly manipulated in a second direction transverse to the first direction when coupled and individually manipulated in the second direction when not coupled; and means for selectively coupling at least two of the plurality of panes which are adjacent in the second direction such that the at least two panes can be jointly manipulated in the first direction when coupled and individually manipulated in the first direction when not coupled;

means for selectively coupling a first pane, at least one second pane adjacent the first pane in the first direction, and at least one third pane adjacent the first pane in the second direction such that the first pane, the at least one second pane, and the at least one third pane can be jointly manipulated in the first and second directions when coupled.

39. A tiling system having a plurality of non-overlapping panes, wherein a pane can be situated adjacent to more than one pane along an edge in a first direction, and wherein a pane can be situated adjacent to more than one pane along an edge in a second direction transverse to the first direction, the tiling system comprising:

means for selectively coupling at least two of the plurality of panes which are adjacent in a first direction such that the at least two panes can be jointly manipulated in a second direction transverse to the first direction when coupled and individually manipulated in the second direction when not coupled, wherein the means for selectively coupling includes:
a first individually selectable control for coupled manipulation of the at least two panes; and
a second individually selectable control for uncoupled manipulation of at least one of the at least two panes.

40. The tiling system of claim 39, further comprising means for selectively coupling at least two of the plurality of panes which are adjacent in the second direction such that the at least two panes can be jointly manipulated in the first direction when coupled and individually manipulated in the first direction when not coupled.

41. A tiling system comprising:

a plurality of non-overlapping panes, wherein a pane can be situated adjacent to more than one pane along an edge in a first direction, and wherein a pane can be situated adjacent to more than one pane along an edge in a second direction transverse to the first direction;

means for associating at least one application region with at least one of said plurality of panes;

means for changing an association of a first application region from an association with a first one of said plurality of panes to an association with a second one of said plurality of panes.

42. The tiling system of claim 41, further comprising means for changing an association of a second application region associated with said second pane to an association with said first pane when the association of the first application region with the first pane is changed.

43. A tiling system comprising:
a plurality of non-overlapping panes;
a plurality of partitions adjacent said plurality of panes;
means for jointly displaying partitions which are aligned; and
means for displaying at least one of the aligned partitions distinctly from the partitions which are aligned.

44. The tiling system of claim 43, wherein the display means displays each of the partitions in the set of aligned partitions distinctly from the set of aligned partitions.

45. The tiling system of claim 44, further comprising:
means for selecting one of a single partition and a set of aligned partitions including said single partition; and
means for moving the selected one of a single partition and set of aligned partitions so as to manipulate at least one pane.

46. The tiling system of claim 43, wherein a pane can be situated adjacent to more than one pane along an edge in a first direction, and wherein a pane can be situated adjacent to more than one pane along an edge in a second direction transverse to the first direction.

47. A system for creating partitions adjacent panes in a tiling system having a plurality of panes, a first set of aligned edges of a first set of the panes, and a second set of aligned edges of a second set of the panes which is adjacent to the first set of panes, wherein the second set of aligned edges is aligned with the first set of aligned edges, the system comprising:

means for iteratively expanding a first subset of the first set of aligned edges;
means for iteratively expanding a second subset of the second set of aligned edges;
means for determining whether the first subset is coextensive with the second subset; and
means for identifying coextensive subsets as partitions.

48. The system of claim 47, wherein a pane can be situated adjacent to more than one pane along an edge in a first direction, and wherein a pane can be situated adjacent to more than one pane along an edge in a second direction transverse to the first direction.

49. The tiling system of claim 47, further comprising partition set creating means for creating sets of aligned partitions.

50. A non-overlapping tiling system comprising:
a plurality of non-overlapping panes, wherein a pane can be situated adjacent to more than one pane along an edge in a first direction, and wherein a pane can be situated adjacent to more than one pane along an edge in a second direction transverse to the first direction;

a plurality of partitions adjacent to said plurality of panes;

means for selecting one of a single partition and a set of aligned partitions including said single partition as a movement partition; and means for moving the movement partition.

51. The tiling system of claim 50, wherein the means for selecting includes at least one first individually selectable control for selecting the single partition and at least one second individually selectable control for selecting the set of aligned partitions including the single partition.

52. The tiling system of claim 51, further comprising:
means for simultaneously and distinctly displaying the at least one first individually selectable control and the at least one second individually selectable control.

53. An apparatus for manipulating panes in a tiling system having a plurality of non-overlapping panes comprising:

first manipulation means for simultaneously moving a first edge which is an edge of a first pane and a second edge which is an edge of a second pane and which extends the first edge;

second manipulation means for moving the first edge without moving the second edge;

third manipulation means for simultaneously moving a third edge, which is an edge of the first pane transverse to the first edge, together with one of the first edge, the second edge, and a fourth edge which extends the third edge; and fourth manipulation means for moving the third edge without moving the first, second and fourth edges.

54. The tiling system of claim 53 further comprising means for associating application regions of another interface with respective ones of said plurality of panes.

55. A tiling system comprising:
a plurality of non-overlapping panes;
a plurality of partitions adjacent said plurality of panes; and
aligning means for aligning a first partition with a second partition when said first partition is within a range of said second partition; and
wherein the aligning means includes means for altering said range.

56. The tiling system of claim 55, wherein a pane can be situated adjacent to more than one pane along an edge in a first direction, and wherein a pane can be situated adjacent to more than one pane along an edge in a second direction transverse to the first direction.

57. A tiling system comprising:
a plurality of non-overlapping panes;
a plurality of partitions adjacent said plurality of panes; and
aligning means for aligning a first partition with a second partition when said first partition is within a range of said second partition; and
wherein said aligning means includes:
a plurality of predefined partition positions; and
means for locating a partition into alignment with one of said plurality of predefined positions.

58. The tiling system of claim 57, wherein a pane can be situated adjacent to more than one pane along an edge in a first direction, and wherein a pane can be situated adjacent to more than one pane along an edge in a second direction transverse to the first direction.

59. A tiling system comprising:
a plurality of non-overlapping panes;
a plurality of partitions adjacent to said plurality of panes, wherein at least two of the plurality of partitions are aligned; and
means for creating an additional pane including:
first means for defining an area for placement of the additional pane by movement of one partition of the aligned partitions; and
second means for defining an area for placement of the additional pane by movement of the one partition and at least one other of the aligned partitions.

60. A tiling system having a plurality of non-overlapping panes and a plurality of partitions adjacent to the panes, the system comprising:
means for moving at least one partition to define an area between an initial position and a final position of the at least one partition; and
means for creating an additional pane in the area such that one of the panes is situated adjacent to more than one pane along an edge in a first direction and one of the panes is situated adjacent to more than one pane along an edge in a second direction transverse to the first direction.

61. A tiling system comprising:
a plurality of non-overlapping panes;
a plurality of partitions abutting said plurality of panes; and
means for creating an additional pane including means for defining an area for placement of the additional by moving a partition between two adjacent panes.

62. A tiling system comprising:
a plurality of non-overlapping panes;
a plurality of partitions adjacent said plurality of panes, wherein at least two partitions are aligned;

first parallel moving means for moving a partition parallel to the aligned partitions and moving one of the aligned partitions so as to maintain a predetermined dimension for at least one of said plurality of panes; and
second parallel moving means for moving the partition parallel to the aligned partitions and moving the aligned partitions so as to maintain a predetermined dimension for at least one of said plurality of panes.

63. A tiling system comprising:
a plurality of non-overlapping panes;
a plurality of partitions adjacent said plurality of panes, wherein at least two of the plurality of partitions are transverse;
parallel moving means for moving a first transverse partition, a second transverse partition, at least one partition parallel to the first transverse partition and at least one partition parallel to the second transverse partition so as to maintain a predetermined dimension of at least one of the plurality of panes.

64. A computer system comprising:
a processor for executing program steps; and
a display connected to the processor; and
a set of program steps to be executed on the processor which generate a tiling system on the display, the tiling system including:
a plurality of non-overlapping panes, wherein a pane can be situated adjacent to more than one pane along an edge in a first direction, and wherein a pane can be situated adjacent to more than one pane along an edge in a second direction transverse to the first direction;
a plurality of partitions adjacent to said plurality of panes, wherein at least two of the plurality of partitions have a common end;
means for moving one of the partitions having a common end; and
means for simultaneously moving the at least two partitions having a common end.

65. A tiling system comprising:
a plurality of non-overlapping panes, wherein a pane can be situated adjacent to more than one pane along an edge in a first direction, and wherein a pane can be situated adjacent to more than one pane along an edge in a second direction transverse to the first direction, and wherein at least one of the panes is a tenanted pane with which an application region is associated, and at least one of the panes is an untenanted pane with which no application region is associated; and
means for displaying each application region at a position corresponding to an associated tenanted pane and for displaying each untenanted pane as an empty pane.

66. The tiling system of claim 65, further comprising means for associating an application region with the at least one untenanted pane.

67. The tiling system of claim 66, further comprising means for exchanging application region associations between a first pane and a second pane.

68. The tiling system of claim 65, wherein an application region is associated with a tenanted pane, the system further comprising:
means for associating the application region with an untenanted pane.

69. The tiling system of claim 68, further comprising means for removing an association of the tenanted pane and the application region so that the tenanted pane becomes an untenanted pane.

70. The tiling system of claim 65, further comprising means for removing an association of the tenanted pane and the application region so that the tenanted pane becomes an untenanted pane.

71. The tiling system of claim 70, wherein one of the first pane and second pane is an untenanted pane having a null application region association.

72. A tiling system having a plurality of non-overlapping panes comprising:
- means for selectively coupling at least two of the plurality of panes which are adjacent in a first direction such that the at least two panes can be jointly manipulated in a second direction transverse to the first direction when coupled and individually manipulated in the second direction when not coupled; and
- means for selectively coupling at least two of the plurality of panes which are adjacent in the second direction such that the at least two panes can be jointly manipulated in the first direction when coupled and individually manipulated in the first direction when not coupled;
- wherein the means for selectively coupling includes:
  - a first individually selectable control for coupled manipulation of the at least two panes; and
  - a second individually selectable control for uncoupled manipulation of the at least two panes.

73. The tiling system of claim 72, further comprising:
- means for manipulating the plurality of partitions and the at least one set of aligned partitions, wherein displayed partitions and displayed aligned partitions are controls for selecting one of the partitions or sets of aligned partitions to be manipulated.

74. A non-overlapping tiling system comprising:
- a plurality of non-overlapping panes;
- a plurality of partitions adjacent to said plurality of panes, wherein the plurality of partitions include at least one set of aligned partitions including at least two partitions which are aligned;
- means for displaying the plurality of partitions; and
- means for jointly displaying the at least one set of aligned partitions distinctly from the plurality of partitions.

75. The tiling system of claim 74, wherein a pane can be situated adjacent to more than one pane along an edge in a first direction, and wherein a pane can be situated adjacent to more than one pane along an edge in a second direction transverse to the first direction.

* * * * *